US011335939B2

(12) United States Patent
Inoue

(10) Patent No.: US 11,335,939 B2
(45) Date of Patent: *May 17, 2022

(54) FUEL CELL STACK AND METHOD OF PRODUCING DUMMY CELL

(71) Applicant: HONDA MOTOR CO., LTD., Tokyo (JP)

(72) Inventor: Daisuke Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 16/807,204

(22) Filed: Mar. 3, 2020

(65) Prior Publication Data

US 2020/0287231 A1   Sep. 10, 2020

(30) Foreign Application Priority Data

Mar. 5, 2019   (JP) .............................. JP2019-039503

(51) Int. Cl.
*H01M 8/242* (2016.01)
*H01M 8/0267* (2016.01)
*H01M 8/0239* (2016.01)
*H01M 8/1004* (2016.01)

(52) U.S. Cl.
CPC ......... *H01M 8/242* (2013.01); *H01M 8/0239* (2013.01); *H01M 8/0267* (2013.01); *H01M 8/1004* (2013.01)

(58) Field of Classification Search
None
See application file for complete search history.

(56) References Cited

U.S. PATENT DOCUMENTS

2006/0110649 A1   5/2006   Nishiyama et al.
2020/0295384 A1*  9/2020   Inoue .................. H01M 8/0273

FOREIGN PATENT DOCUMENTS

JP            4727972            7/2011

* cited by examiner

*Primary Examiner* — Alix E Eggerding
(74) *Attorney, Agent, or Firm* — Amin, Turocy & Watson, LLP

(57) ABSTRACT

A fuel cell stack at least includes a stack body including a plurality of power generation cells each having a membrane electrode assembly stacked in a stacking direction, and a first dummy cell provided at one end of the stack body in the stacking direction. A dummy structural body of the first dummy cell is joined to a dummy resin frame member through an adhesive layer which adheres a first outer peripheral portion and a second outer peripheral portion, and inner periphery of the dummy resin frame member to each other.

14 Claims, 13 Drawing Sheets

FUEL CELL STACK AND METHOD OF PRODUCING DUMMY CELL

CROSS-REFERENCE TO RELATED APPLICATION

This application is based upon and claims the benefit of priority from Japanese Patent Application No. 2019-039503 filed on Mar. 5, 2019, the contents of which are incorporated herein by reference.

BACKGROUND OF THE INVENTION

Field of the Invention

The present invention relates to a fuel cell stack including a stack body formed by stacking a plurality of power generation cells in a stacking direction, and a dummy cell provided at one end of the stack body in the stacking direction. Each of the power generation cells includes membrane electrode assembly and a resin frame member provided around an outer periphery of the membrane electrode assembly. Further, the present invention relates a method of producing the dummy cell.

Description of the Related Art

In general, a solid polymer electrolyte fuel cell employs a solid polymer electrolyte membrane (hereinafter, also simply referred to as the electrolyte membrane). The solid polymer electrolyte membrane is a polymer ion exchange membrane. The fuel cell includes a membrane electrode assembly (MEA) including an anode provided on one surface of the electrolyte membrane, and a cathode provided on the other surface of the electrolyte membrane.

The membrane electrode assembly is sandwiched between separators to form a power generation cell, and a plurality of the power generation cells are stacked together to form a stack body. At both ends of the stack body in the stacking direction, components such as power collection terminal plates for collecting electric power generated in power generation by each of the power generation cells, and end plates for holding the power generation cells in the stacked state are provided to form a fuel cell stack.

In this regard, at ends of the stack body in the stacking direction (hereinafter also simply referred to as the ends), for example, heat radiation is facilitated through the terminal plates, etc. Therefore, the ends of the stack body in the stacking direction tend to have low temperature in comparison with the center of the stack body in the stacking direction. When the temperature at the ends of the stack body becomes low due to the influence of the outside temperature, etc., there is a concern that diffusion performance of the fuel gas and the oxygen-containing gas (reactant gases) becomes low, and the power generation stability of the fuel cell stack is degraded.

Under the circumstances, for example, in the fuel cell stack disclosed in Japanese Patent No. 4727972, so called a dummy cell is provided at least at one end of the stack body in the stacking direction. The dummy cell employs a metal plate instead of the electrolyte membrane. Therefore, no power generation is performed in the dummy cell, and thus, no water is produced in the dummy cell. Therefore, the dummy cell itself functions as a heat insulating layer between the terminal plate and the stack body. Thus, by providing the dummy cell as described above, it is possible to suppress decrease in the temperature at the ends of the stack body. That is, it is possible to suppress the influence of the outside temperature on the fuel cell stack, and improve the power generation stability.

SUMMARY OF THE INVENTION

The present invention has been made in relation to the technique of this type, and an object of the present invention is to provide a fuel cell stack and a method of producing a dummy cell in which it is possible to improve power generation stability by a dummy cell which can be produced highly accurately and efficiently.

According to an aspect of the present invention, a fuel cell stack is provided. The fuel cell stack includes a stack body including a plurality of power generation cells stacked in a stacking direction, the power generation cells each including a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly, a dummy cell provided at least at one end of the stack body in the stacking direction, wherein the dummy cell includes a dummy structural body corresponding to the membrane electrode assembly, and a dummy resin frame member provided around an outer periphery of the dummy structural body, the dummy structural body is formed by stacking a first electrically conductive porous body, a second electrically conductive porous body having a surface size smaller than that of the first electrically conductive porous body, and a third electrically conductive porous body having a surface size smaller than that of the second electrically conductive porous body together in this order, the first electrically conductive porous body includes a first outer peripheral portion extending outside an outer peripheral end surface of the second electrically conductive porous body, the second electrically conductive porous body includes a second outer peripheral portion extending outside an outer peripheral end surface of the third electrically conductive porous body, and the dummy structural body and the dummy resin frame member are joined together through an adhesive layer which adheres the first outer peripheral portion, the second outer peripheral portion, and an inner periphery of the dummy resin frame member to each other.

According to another aspect of the present invention, a method of producing a dummy cell provided at least at one end of a stack body of a fuel cell stack in a stacking direction is provided. The fuel cell stack includes the stack body including a plurality of power generation cells stacked in the stacking direction, the power generation cells each including a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly. The method includes a dummy structural body forming step of obtaining a dummy structural body corresponding to the membrane electrode assembly by stacking a first electrically conductive porous body, a second electrically conductive porous body having a surface size smaller than that of the first electrically conductive porous body, and a third electrically conductive porous body having a surface size smaller than that of the second electrically conductive porous body together in this order, and a joining step of joining the dummy structural body and the dummy resin frame member provided around an outer periphery of the dummy structural body together, wherein the first electrically conductive porous body includes a first outer peripheral portion extending outside an outer peripheral end surface of the second electrically conductive porous body, the second electrically conductive porous body includes a second outer peripheral portion extending outside an outer peripheral end surface of the third electrically conductive porous body, and in the joining step, an adhesive interposed between the first and second outer peripheral portions and an inner periphery of the dummy resin frame member is hardened to form an adhesive layer which adheres the first and second outer peripheral portions and the dummy resin frame member to each other.

In the dummy cell, the dummy structural body and the dummy resin frame member are joined together through the adhesive layer which adheres the first outer peripheral portion and the second outer peripheral portion to each other. The dummy cell obtained in this manner can be produced highly accurately and efficiently, e.g., by melting part of the dummy resin frame member and impregnating the dummy structural body with the melted resin, in comparison with the dummy cell obtained by joining the dummy structural body and the dummy resin frame member together.

That is, in the case of melting part of the dummy resin frame member to join the dummy resin frame member and the dummy structural body together, it is necessary to heat part of the dummy resin frame member up to the softening temperature or more, to change it into the melted resin. Further, it is necessary to decrease the temperature of the melted resin impregnated into the dummy structural body from the above high temperature to the solidifying temperature.

In contrast, in the case of joining the dummy structural body and the dummy resin frame member together through the adhesive layer, it is not necessary to heat the dummy resin frame member up to the above high temperature. Therefore, it is possible to suppress warpage, etc. due to temperature increase in the dummy resin frame member, and produce each of the dummy cells highly accurately. Further, it is possible to harden the adhesive, and form the adhesive layer in a short period of time, in comparison with the wait time until the dummy resin frame member is heated, and changed into melted resin, and the wait time until the temperature of the melted resin is decreased from the high temperature to solidify the melted resin decrease. Therefore, it becomes possible to reduce the time required for joining the dummy resin frame member and the dummy structural body together, and produce each of the dummy cells efficiently.

This dummy cell includes the dummy structural body instead of the membrane electrode assembly of the power generation cell. That is, since the dummy cell does not include the solid polymer electrolyte membrane or the membrane electrode assembly, power generation is not performed, and thus, no water is produced. As a result, the dummy cell itself functions as a heat insulating layer, and it is possible to suppress water condensation in the dummy cell. By providing the dummy cell of this kind at least at one end of the stack body in stacking direction, it is possible to improve heat insulating performance at the end of the stack body. Therefore, even under the low temperature environment, it is possible to eliminate or reduce the situation where the temperature at the ends of the stack body becomes low in comparison with the central side. That is, it is possible to improve the power generation stability.

As described above, in the fuel cell stack according to the present invention, it is possible to improve the power generation stability by each of the dummy cells which can be produced highly accurately and efficiently. Further, in the method of producing the dummy cell according to the present invention, it is possible to accurately, and efficiently produce the dummy cells which make it possible to improve the power generation stability of the fuel cell stack.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

DESCRIPTION OF THE PREFERRED EMBODIMENTS

Figure 1:
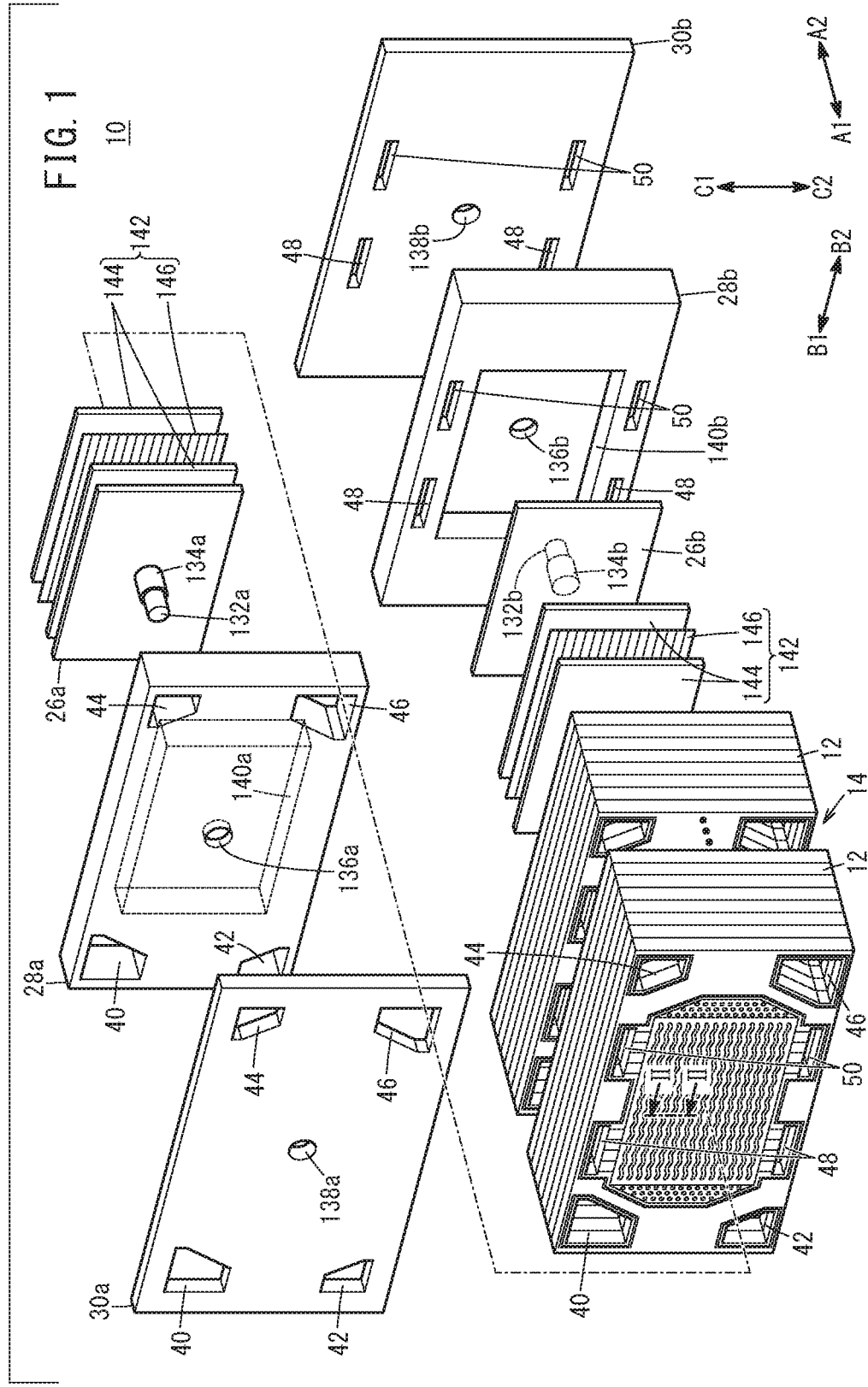
FIG. 1 is an exploded perspective view showing a fuel cell stack according to an embodiment of the present invention.

A preferred embodiment of a method of producing a fuel cell stack and a dummy cell according to the present invention will be described in detail with reference to the accompanying drawings. In the following drawings, the constituent elements having identical or similar functions and advantages are labeled with the same reference numerals, and repeated description may be omitted.

Figure 2:
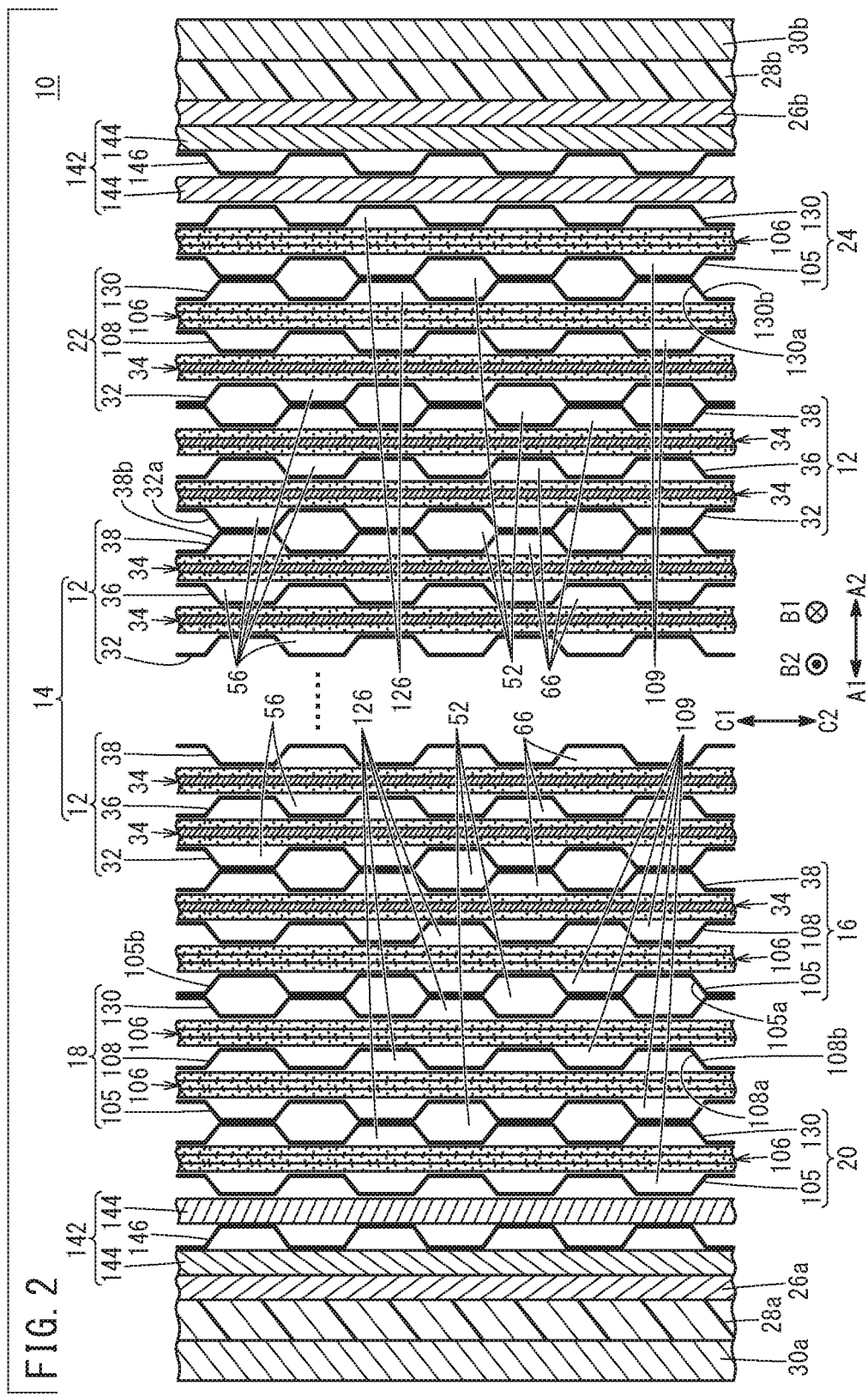
FIG. 2 is a cross sectional view taken along arrow lines II-II in FIG. 1.

As shown in FIGS. 1 and 2, a fuel cell stack 10 according to the embodiment of the present invention includes a stack body 14 formed by stacking a plurality of power generation cells 12 in a horizontal direction (direction indicated by arrows A1 and A2) or the gravity direction (direction indicated by arrows C1 and C2). For example, the fuel cell stack 10 is mounted in a fuel cell vehicle such as a fuel cell electric automobile (not shown).

As shown in FIG. 2, at one end of the stack body 14 in a stacking direction (indicated by an arrow A1), a first end power generation unit 16 is disposed. A first dummy cell 18 is disposed outside the first end power generation unit 16, and a second dummy cell 20 is disposed outside the first dummy cell 18. Further, at the other end of the stack body 14 in the stacking direction (indicated by an arrow A2), a second end power generation unit 22 is disposed. A third dummy cell 24 is disposed outside the second end power generation unit 22. A terminal plate 26a is disposed outside the second dummy cell 20 of the stack body 14 (in the direction indicated by the arrow A1). An insulator 28a is disposed outside the terminal plate 26a, and an end plate 30a is disposed outside the insulator 28a. A terminal plate 26b is disposed outside the third dummy cell 24 of the stack body 14 (in the direction indicated by the arrow A2). An insulator 28b is disposed outside the terminal plate 26b, and an end plate 30b is disposed outside the insulator 28b.

As shown in FIG. 1, coupling bars (not shown) are disposed between respective sides of the end plates 30a, 30b having a rectangular shape. Both ends of the coupling bars are fixed to inner surfaces of the end plates 30a, 30b using bolts (not shown), and a tightening load in a stacking direction (directions indicated by the arrows A1 and A2) is applied to the plurality of power generation cells 12 that are stacked together. It should be noted that, the fuel cell stack 10 may have a casing including the end plates 30a, 30b, and the stack body 14, etc. may be placed in the casing.

Figure 3:
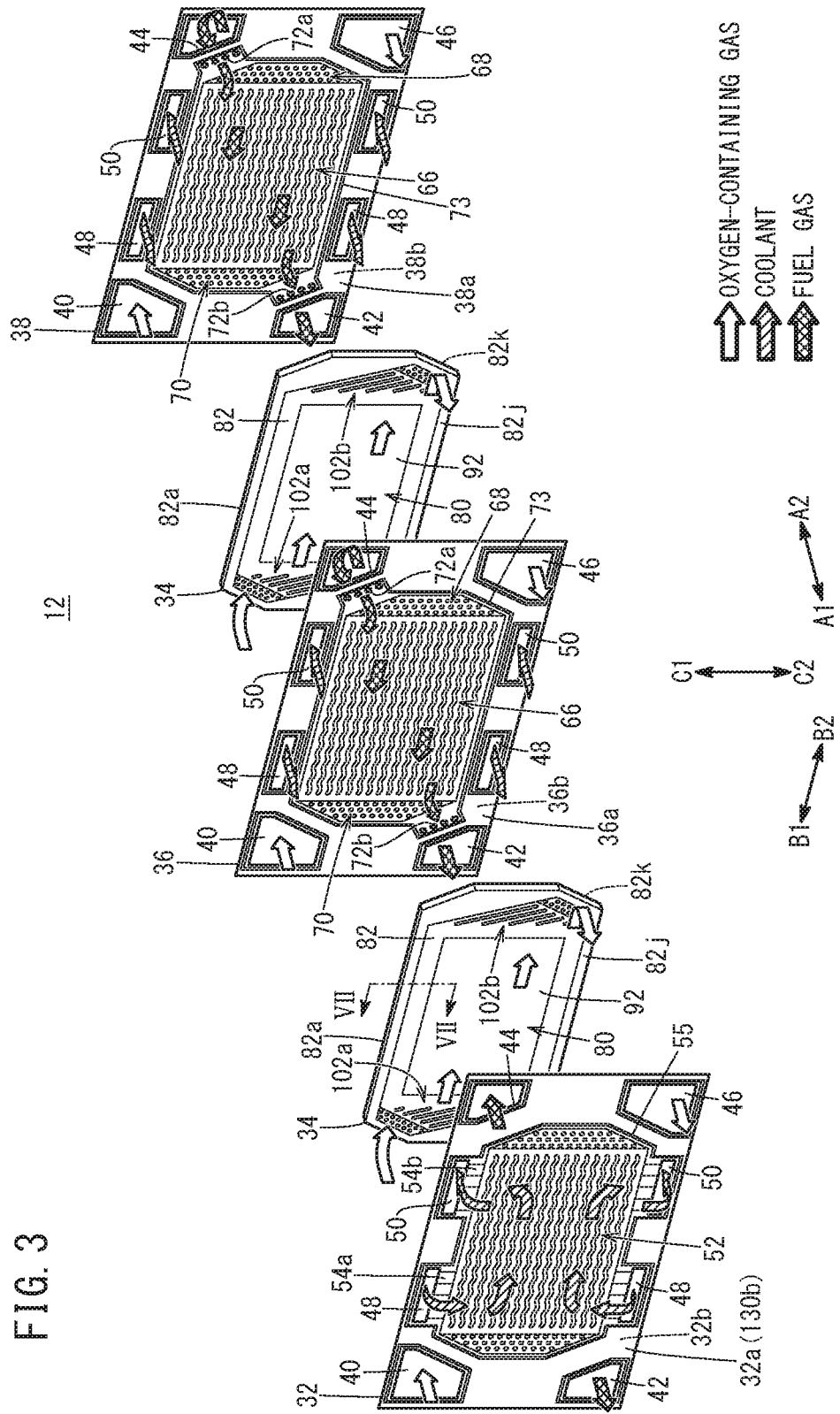
FIG. 3 is an exploded perspective view showing a power generation cell.

As shown in FIG. 3, each of the power generation cells 12 is formed by stacking a first separator 32, a resin frame equipped MEA 34, a second separator 36, a resin frame equipped MEA 34, and a third separator 38 together in this order. Each of the first separator 32, the second separator 36, and the third separator 38 (each of the separators) is formed by a steel plate, a stainless steel plate, aluminum plate, a plated steel plate, etc., and has a rectangular flat surface. Each of the first separator 32, the second separator 36, and the third separator 38 is formed by press forming to have a corrugated shape in cross section.

As shown in FIGS. 1 and 3, at one end of each separator in a long side direction (indicated by an arrow B1), an oxygen-containing gas supply passage 40 and a fuel gas discharge passage 42 are provided. The oxygen-containing gas supply passage 40 and the fuel gas discharge passage 42 penetrate through each separator in the directions indicated by the arrows A1 and A2 (stacking direction). An oxygen-containing gas is supplied through the oxygen-containing gas supply passage 40. A fuel gas such as the hydrogen-containing gas is discharged through the fuel gas discharge passage 42. The oxygen-containing gas and the fuel gas are also referred to as the reactant gases, collectively.

At the other end of each separator in the long side direction (indicated by the arrow B2), a fuel gas supply passage 44 for supplying the fuel gas, and an oxygen-containing gas discharge passage 46 for discharging the oxygen-containing gas are provided. The fuel gas supply passage 44 and the oxygen-containing gas discharge passage 46 penetrate through each separator in the directions indicated by the arrows A1, A2. It should be noted that the oxygen-containing gas supply passage 40, the fuel gas discharge passage 42, the fuel gas supply passage 44, the oxygen-containing gas discharge passage 46 are also referred to as the reactant gas passages, collectively.

At both ends of each separator in the short side direction (direction indicated by arrows C1, C2) on one side in the direction indicated by the arrow B1, a pair of coolant supply passages 48 for supplying the coolant are provided respectively. The coolant supply passages 48 extend through each separator in the directions indicated by the arrows A1 and A2. At both ends of each separator in the short side direction on one side indicated by the arrow B2, a pair of coolant discharge passages 50 for discharging the coolant are provided, respectively. The coolant discharge passages 50 extend through each separator in the directions indicated by the arrows A1 and A2.

As shown in FIG. 3, the first separator 32 has a coolant flow field 52 on its surface 32a indicated by the arrow A1. The coolant flow field 52 is connected to the coolant supply passages 48 and the coolant discharge passages 50. A plurality of inlet connection grooves 54a are formed between the coolant supply passages 48 and the coolant flow field 52. A plurality of outlet connection grooves 54b are formed between the coolant flow field 52 and the coolant discharge passages 50. Further, a seal member 55 is formed on the surface 32a of the first separator 32. The seal member 55 is provided around all of the coolant supply passage 48, the coolant discharge passage 50, the coolant flow field 52, the inlet connection grooves 54a, the outlet connection grooves 54b to provide sealing between the inside and the outside of the seal member 55 in the surface direction.

Figure 4:
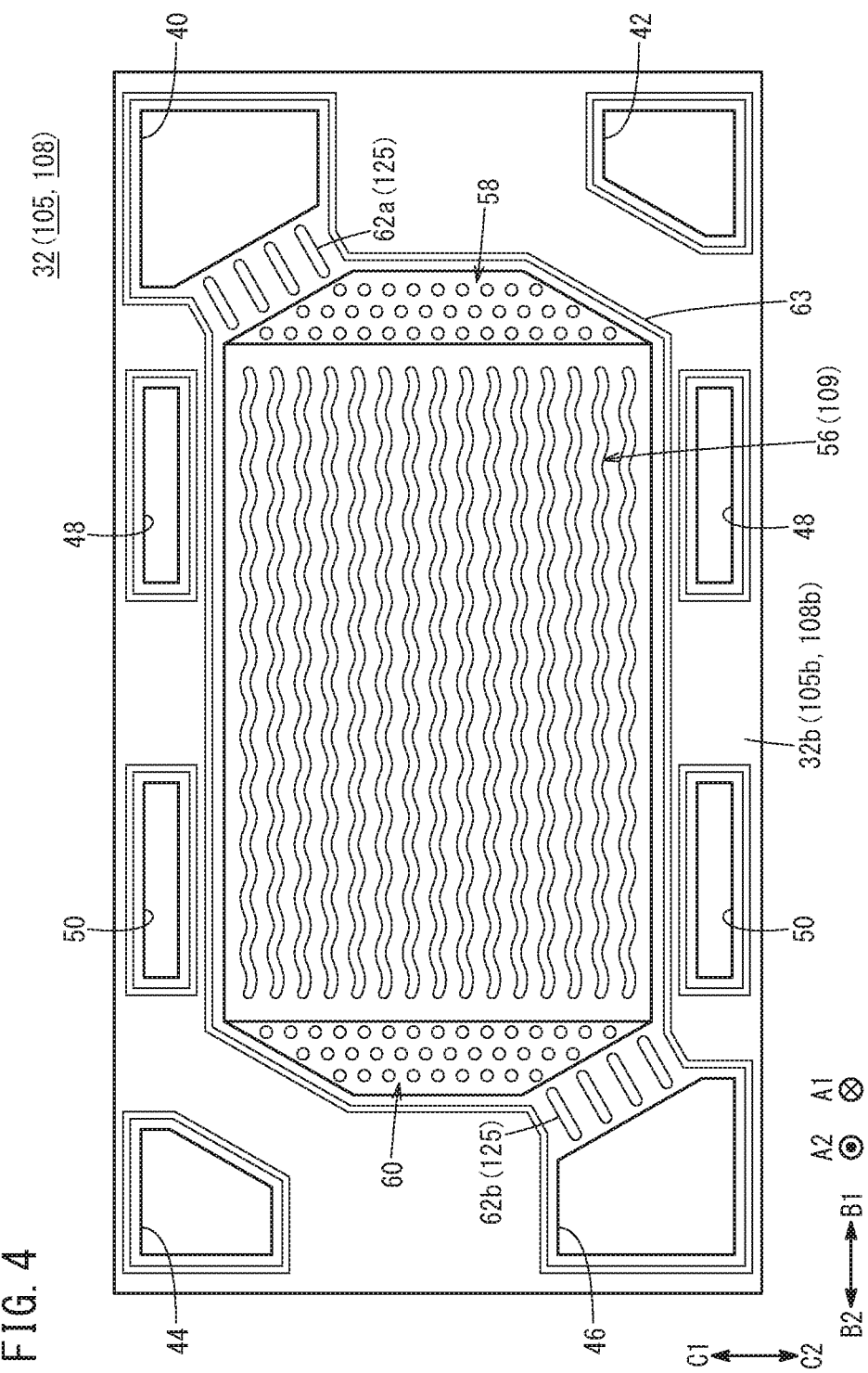
FIG. 4 is a front view of a first separator showing a side where an oxygen-containing gas flow field is present.

As shown in FIG. 4, the first separator 32 has an oxygen-containing gas flow field 56 on its surface 32b indicated by the arrow A2. The oxygen-containing gas flow field 56 is connected to the oxygen-containing gas supply passage 40 and the oxygen-containing gas discharge passage 46. The oxygen-containing gas flow field 56 includes a plurality of wavy flow grooves (or straight flow grooves) arranged in parallel to each other.

An oxygen-containing gas inlet buffer 58 is connected to an inlet end of the oxygen-containing gas flow field 56, positioned outside the power generation area, and an oxygen-containing gas outlet buffer 60 is connected to an outlet end of the oxygen-containing gas flow field 56, positioned outside the power generation area.

A plurality of inlet connection grooves 62a are formed between the oxygen-containing gas inlet buffer 58 and an oxygen-containing gas supply passage 40. A plurality of outlet connection grooves 62b are formed between the oxygen-containing gas outlet buffer 60 and the oxygen-containing gas discharge passage 46. A seal member 63 is formed on the surface 32b of the first separator 32. The seal member 63 is provided around all of the oxygen-containing gas supply passage 40, the oxygen-containing gas discharge passage 46, the oxygen-containing gas flow field 56, the oxygen-containing gas inlet buffer 58, the oxygen-containing gas outlet buffer 60, the inlet connection grooves 62a, and the outlet connection grooves 62b to provide sealing between the inside the outside of the seal member 63 in the surface direction. In the first separator 32, the back surface of the oxygen-containing gas flow field 56 forms part of the coolant flow field 52 (see FIGS. 2 and 3).

As shown in FIG. 3, the second separator 36 has a fuel gas flow field 66 on its surface 36a indicated by an arrow A1. The fuel gas flow field 66 is connected to the fuel gas supply passage 44 and the fuel gas discharge passage 42. The fuel gas flow field 66 includes a plurality of wavy flow grooves (or straight flow grooves) arranged in parallel to each other.

A fuel gas inlet buffer 68 is connected to an inlet end of the fuel gas flow field 66, positioned outside the power generation area, and a fuel gas outlet buffer 70 is connected to an outlet end of the fuel gas flow field 66, positioned outside the power generation area. A plurality of fuel gas supply holes 72a are provided between the fuel gas inlet buffer 68 and the fuel gas supply passage 44. The fuel gas supply holes 72a penetrate through the second separator 36 in the thickness direction. A plurality of fuel gas discharge holes 72*b* are provided between the fuel gas outlet buffer 70 and the fuel gas discharge passage 42. The fuel gas discharge holes 72*b* penetrate through the second separator 36 in the thickness direction.

A seal member 73 is formed on the surface 36*a* of the second separator 36. The seal member 73 is provided around all of the fuel gas flow field 66, the fuel gas inlet buffer 68, the fuel gas outlet buffer 70, the fuel gas supply holes 72*a*, the fuel gas discharge holes 72*b* to provide sealing between the inside and outside of the seal member 73 in the surface direction.

Figure 5:
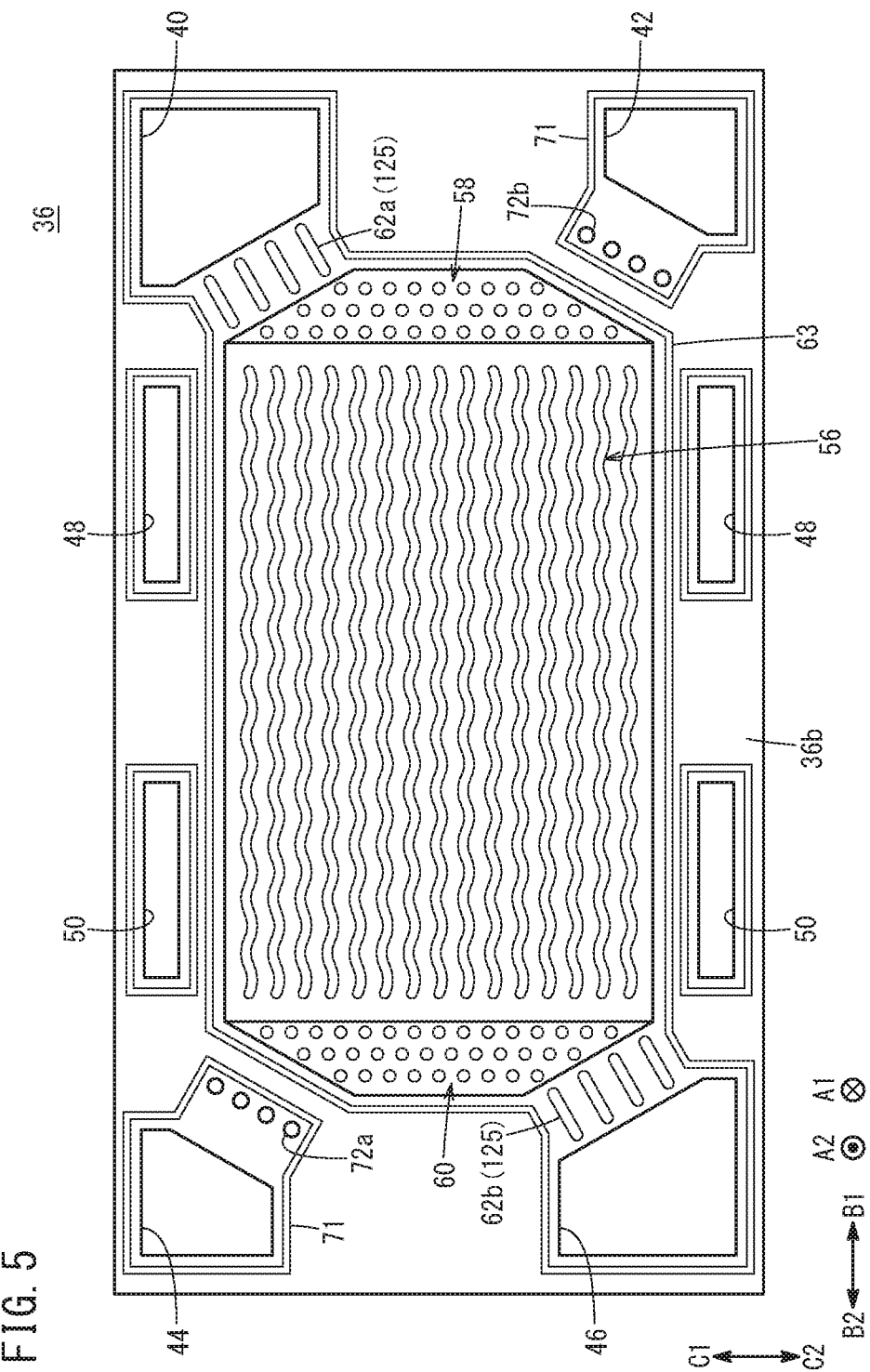
FIG. 5 is a front view of a second separator showing a side where the oxygen-containing gas flow field is present.

As shown in FIG. 5, a surface 36*b* of the second separator 36 on the side in the direction indicated by the arrow A2 has the same structure as the surface 32*b* of the first separator 32 on the side in the direction indicated by the arrow A2 except that fuel gas supply holes 72*a* and fuel gas discharge holes 72*b* surrounded by seal members 71 are provided (see FIG. 4). That is, the oxygen-containing gas flow field 56 is provided on the surface 36*b* of the second separator 36. The oxygen-containing gas flow field 56 is connected to the oxygen-containing gas supply passage 40 and the oxygen-containing gas discharge passage 46. Further, an oxygen-containing gas inlet buffer 58, an oxygen-containing gas outlet buffer 60, inlet connection grooves 62*a*, outlet connection grooves 62*b*, and a seal member 63 are formed on the surface 36*b* of the second separator 36.

On the surface 36*b* of the second separator 36, each of the fuel gas supply holes 72*a* and the fuel gas discharge holes 72*b* is disconnected from the oxygen-containing gas inlet buffer 58 and the oxygen-containing gas outlet buffer 60 by the seal members 63, 71.

As shown in FIG. 3, a surface 38*a* of the third separator 38 on the side indicated by the arrow A1 may have the same structure as the surface 36*a* of the second separator 36 on the side indicated by the arrow A1. That is, the fuel gas flow field 66 connected to the fuel gas supply passage 44 and the fuel gas discharge passage 42 is provided on the surface 38*a* of the third separator 38. Further, the fuel gas inlet buffer 68, the fuel gas outlet buffer 70, the fuel gas supply holes 72*a*, the fuel gas discharge holes 72*b*, and the seal member 73 are formed on the surface 38*a* of the third separator 38.

Figure 6:
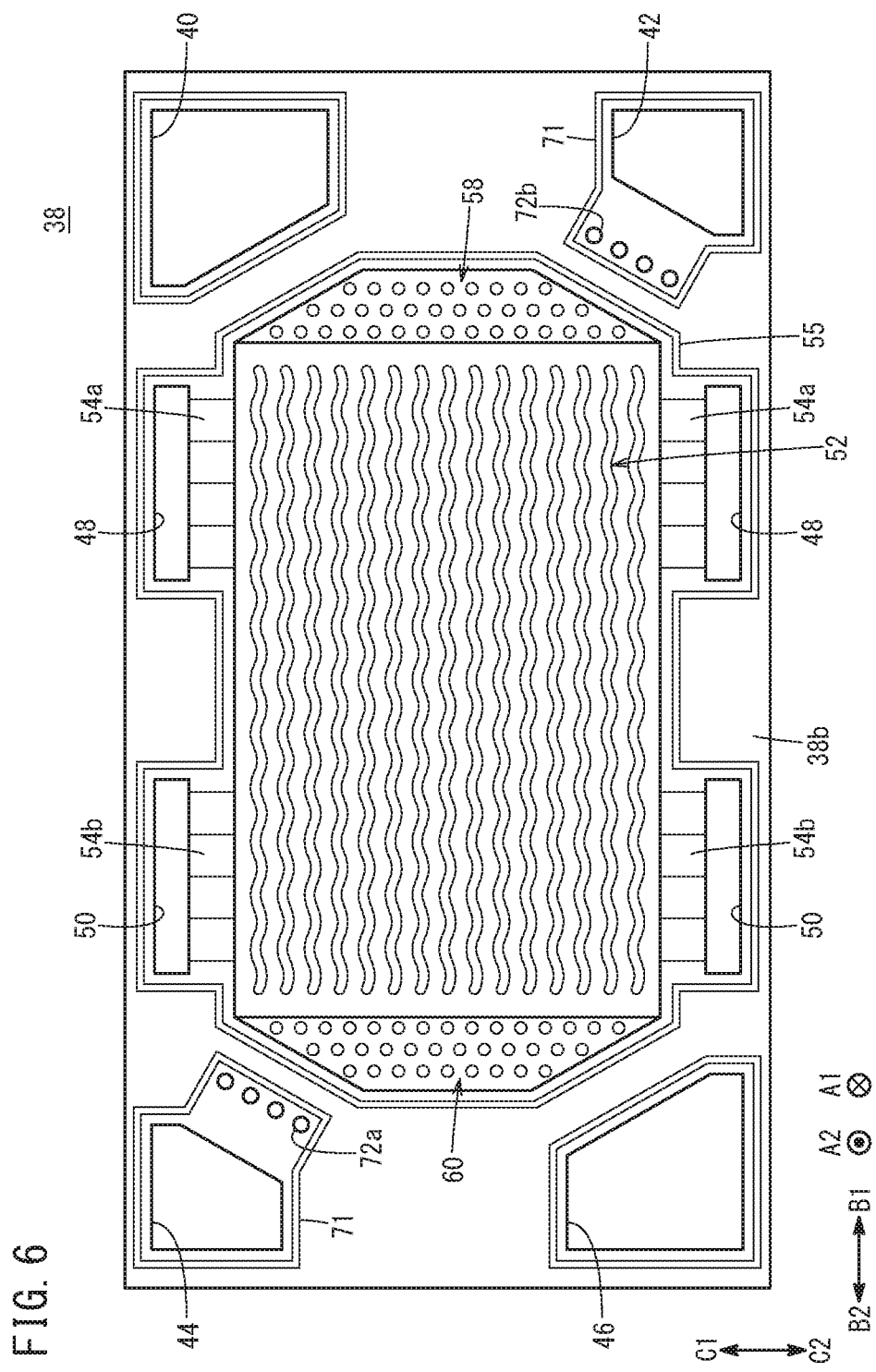
FIG. 6 is a front view of a third separator showing a side where a coolant flow field is present.

As shown in FIG. 6, a surface 38*b* of the third separator 38 on the side indicated by the arrow A2 has the same structure as the surface 32*a* of the first separator 32 on the side in the direction indicated by the arrow A1 except that the fuel gas supply holes 72*a* and the fuel gas discharge holes 72*b* surrounded by the seal member 71 are provided (see FIG. 3). That is, the coolant flow field 52, the inlet connection grooves 54*a*, the outlet connection grooves 54*b*, and the seal member 55 are provided on the surface 38*b* of the third separator 38. On the surface 38*b* of the third separator 38, each of the fuel gas supply holes 72*a*, and the fuel gas discharge holes 72*b* is disconnected from the coolant flow field 52, the inlet connection grooves 54*a*, the outlet connection grooves 54*b*, etc. by the seal members 55, 71.

As shown in FIG. 2, the coolant flow field 52 on the surface 38*b* of the third separator 38 indicated by the arrow A2 and the coolant flow field 52 on the surface 32*a* of the first separator 32 in the direction indicated by the arrow A1 face each other, and the coolant can flow inside the coolant flow filed 52.

As shown in FIGS. 3, 5, and 6, in the second separator 36 and the third separator 38, since the seal members 71, 73 are provided as described above, the fuel gas flowing from the fuel gas supply passage 44 from the side indicated by the arrow A1 to the side indicated by the arrow A2 flows through the fuel gas supply holes 72*a* from the side indicated by the arrow A2 to the side indicated by the arrow A1, and flows into the fuel gas inlet buffer 68 and the fuel gas flow field 66. Further, after the fuel gas which flowed through the fuel gas flow field 66, and flowed into the fuel gas outlet buffer 70, the fuel gas flows through the fuel gas discharge holes 72*b* from the side indicated by the arrow A1 to the side indicated by the arrow A2, and then, the fuel gas flows through the fuel gas discharge passage 42 from the side indicated by the arrow A2 to the side indicated by the arrow A1. Seal members made of elastic material (not shown) provided around the outer peripheral ends of the separators are formed integrally with both surfaces of the separators, respectively.

Figure 7:
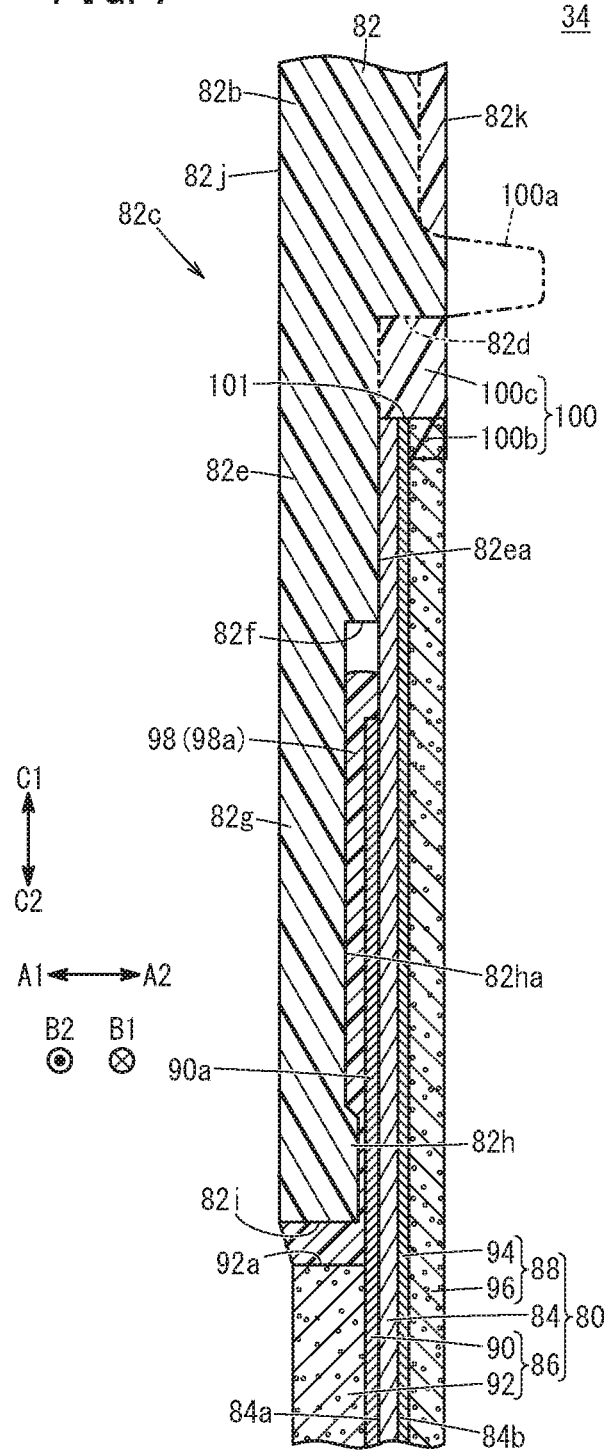
FIG. 7 is a cross sectional view taken along arrow lines VII-VII in FIG. 3.

As shown in FIGS. 3 and 7, the resin frame equipped MEA 34 is formed by joining a resin frame member 82 onto the peripheral portion of a membrane electrode assembly (MEA) 80. As shown in FIG. 7, the membrane electrode assembly 80 includes a solid polymer electrolyte membrane (hereinafter also simply referred to as an electrolyte membrane) 84 which is a thin membrane of perfluorosulfonic acid containing water. A fluorine based electrolyte may be used as the electrolyte membrane 84. Alternatively, an HC (hydrocarbon) based electrolyte may be used for the electrolyte membrane 84. The electrolyte membrane 84 is interposed between a cathode 86 and an anode 88.

The membrane electrode assembly 80 forms an MEA having different sizes of components where the surface size of the cathode 86 is smaller than the surface sizes of the anode 88 and the electrolyte membrane 84. It should be noted that the cathode 86, the anode 88, and the electrolyte membrane 84 may have the same size. Further, the surface size of the anode 88 may be smaller than the surface sizes of the cathode 86 and the electrolyte membrane 84.

The cathode 86 includes a first electrode catalyst layer 90 joined to a surface 84*a* at one end of the electrolyte membrane 84 (side indicated by the arrow A1), and a first gas diffusion layer 92 stacked on the first electrode catalyst layer 90. The surface size of the first electrode catalyst layer 90 is larger than the surface size of the first gas diffusion layer 92, and includes an outer peripheral exposed portion 90*a* protruding from an outer peripheral end surface 92*a* of the first gas diffusion layer 92. Further, the surface size of the first electrode catalyst layer 90 is smaller than the surface size of the electrolyte membrane 84.

The anode 88 includes a second electrode catalyst layer 94 joined to a surface 84*b* at the other end (side indicated by the arrow A2) of the electrolyte membrane 84, and a second gas diffusion layer 96 stacked on the second electrode catalyst layer 94. The surface sizes of the second electrode catalyst layer 94 and the second gas diffusion layer 96 are the same, and are the same as (or smaller than) the surface size of the electrolyte membrane 84.

For example, the first electrode catalyst layer 90 is formed by porous carbon particles deposited uniformly on the surface of the first gas diffusion layer 92 together with an ion conductive polymer binder and platinum alloy supported on the porous carbon particles. The second electrode catalyst layer 94 is formed by porous carbon particles deposited uniformly on the surface of the second gas diffusion layer 96 together with an ion conductive polymer binder and platinum alloy supported on the porous carbon particles.

Each of the first gas diffusion layer 92 and the second gas diffusion layer 96 is formed of electrically conductive porous body such as carbon paper or carbon cloth, etc. The surface size of the second gas diffusion layer 96 is larger than the surface size of the first gas diffusion layer 92.

For example, the resin frame member 82 is made of resin material such as PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. For example, this resin material may be formed by a film, etc. having the uniform thickness.

As shown in FIG. 3, the resin frame member 82 has a frame shape, and is disposed inside a fluid passage group made up of the fluid passages 40, 42, 44, 46, 48, 50 including the oxygen-containing gas supply passage 40, and the fluid passages 40, 42, 44, 46, 48, 50 are not formed in the resin frame member 82. Further, as shown in FIG. 7, the resin frame member 82 has an outer peripheral frame 82b provided over a predetermined length inside an outer peripheral end 82a (see FIG. 3), and an inner expansion 82c provided inside the inner peripheral portion of the outer peripheral frame 82b.

The inner expansion 82c includes a shelf portion 82e extending inward from the inner peripheral portion of the outer peripheral frame 82b through a first stepped surface 82d, and a thin portion 82g extending inward from the inner peripheral portion of the shelf portion 82e through a second stepped surface 82f. The shelf portion 82e is thinner than the outer peripheral frame 82b, and the thin portion 82g is thinner than the shelf portion 82e. Further, the first stepped surface 82d, the shelf portion 82e, the second stepped surface 82f, and the thin portion 82g are provided over the entire periphery of the resin frame member 82. An outer peripheral portion of the surface 84a of the electrolyte membrane 84 contacts a surface 82ea of the shelf portion 82e on the side indicated by the arrow A2. A bank 82h facing an outer peripheral exposed portion 90a of the first electrode catalyst layer 90 is provided over the entire periphery of the inner peripheral portion of the thin portion 82g. Further, a groove 82ha is provided between the bank 82h and the second stepped surface 82f, of the thin portion 82g.

A portion of the surface 84a of the electrolyte membrane 84 positioned close to the groove 82ha and the outer peripheral exposed portion 90a of the first electrode catalyst layer 90 are provided with an adhesion portion 98 formed by a hardened adhesive 98a filled around the outer peripheral exposed portion 90a. This adhesion portion 98 is also filled between an inner peripheral end surface 82i of the resin frame member 82 and the outer peripheral end surface 92a of the first gas diffusion layer 92. Preferably, the adhesive 98a is thermosetting resin in light of excellent heat resistance and easy hardening, etc. However, the adhesive 98a may not be limited to thermosetting resin specially. Examples of resin which can be used as the adhesive 98a include fluorine resin based material, silicone resin based material, epoxy resin based material in liquid or solid form.

The resin frame member 82 and the outer peripheral portion of the second gas diffusion layer 96 are joined together by a joint portion 100 using adhesive resin. The joint portion 100 is provided around the outer peripheral portion of the second gas diffusion layer 96. As shown in FIG. 7, for example, the joint portion 100 is formed by thermally deforming a resin projection 100a which is formed integrally with the resin frame member 82 in a manner that the resin projection 100a is provided around the inner end of the outer peripheral frame 82b and protruding in a direction indicated by the arrow A2. This joint portion 100 is formed by a resin impregnation portion 100b and a first melted and solidified portion 100c.

The resin impregnation portion 100b is formed by impregnating the outer peripheral portion of the second gas diffusion layer 96 with melted resin formed by melting the resin projection 100a. The first melted and solidified portion 100c is formed by allowing the melted resin formed by melting the resin projection 100a to flow between the first stepped surface 82d of the resin frame member 82, and an outer end surface 101 of both the electrolyte membrane 84 and the anode 88, which are disposed at a distance from each other, and solidifying the melted resin.

By providing the adhesion portion 98 around the outer exposed portion 90a of the first electrode catalyst layer 90 and the outer end surface 92a of the first gas diffusion layer 92, and providing the joint portion 100 around the outer peripheral portion of the second gas diffusion layer 96, cross leakage, etc. between the cathode 86 and the anode 88 is prevented.

As shown in FIG. 3, an oxygen-containing gas inlet buffer 102a and an oxygen-containing gas outlet buffer 102b are provided on a surface 82j of the resin frame member 82 facing the cathode 86 (side indicated by the arrow A1). A fuel gas inlet buffer 104a and a fuel gas outlet buffet 104b (see FIG. 8 for both of the fuel gas inlet buffer 104a and the fuel gas outlet buffer 104b) are provided on a surface 82k of the resin frame member 82 facing the anode 88 (side indicated by the arrow A2).

As shown in FIG. 2, the first end power generation unit 16 is formed by stacking, from the side indicated by the arrow A1 toward the side indicated by the arrow A2, a dummy first separator 105, a resin frame equipped dummy structural body 106, a dummy second separator 108, a resin frame equipped MEA 34, and a third separator 38 in this order.

As shown in FIGS. 2 to 4, the dummy first separator 105 has the same structure as the first separator 32. The coolant flow field 52 (see FIG. 3) is provided on a surface 105a at one end of the dummy first separator 105 (side indicated by the arrow A1). Further, as shown in FIG. 2, a first space 109 corresponding to the oxygen-containing gas flow field 56 is provided between a surface 105b at the other end of the dummy first separator 105 (indicated by the arrow A2) and one end of the resin frame equipped dummy structural body 106 (indicated by the arrow A1). As shown in FIG. 4, the first space 109 is connected to the oxygen-containing gas supply passage 40 and the oxygen-containing gas discharge passage 46 through a connection channel 125 formed between the inlet connection grooves 62a and the outlet connection grooves 62b. Therefore, the oxygen-containing gas can flow through the first space 109 as in the oxygen-containing gas flow field 56.

Figure 8:
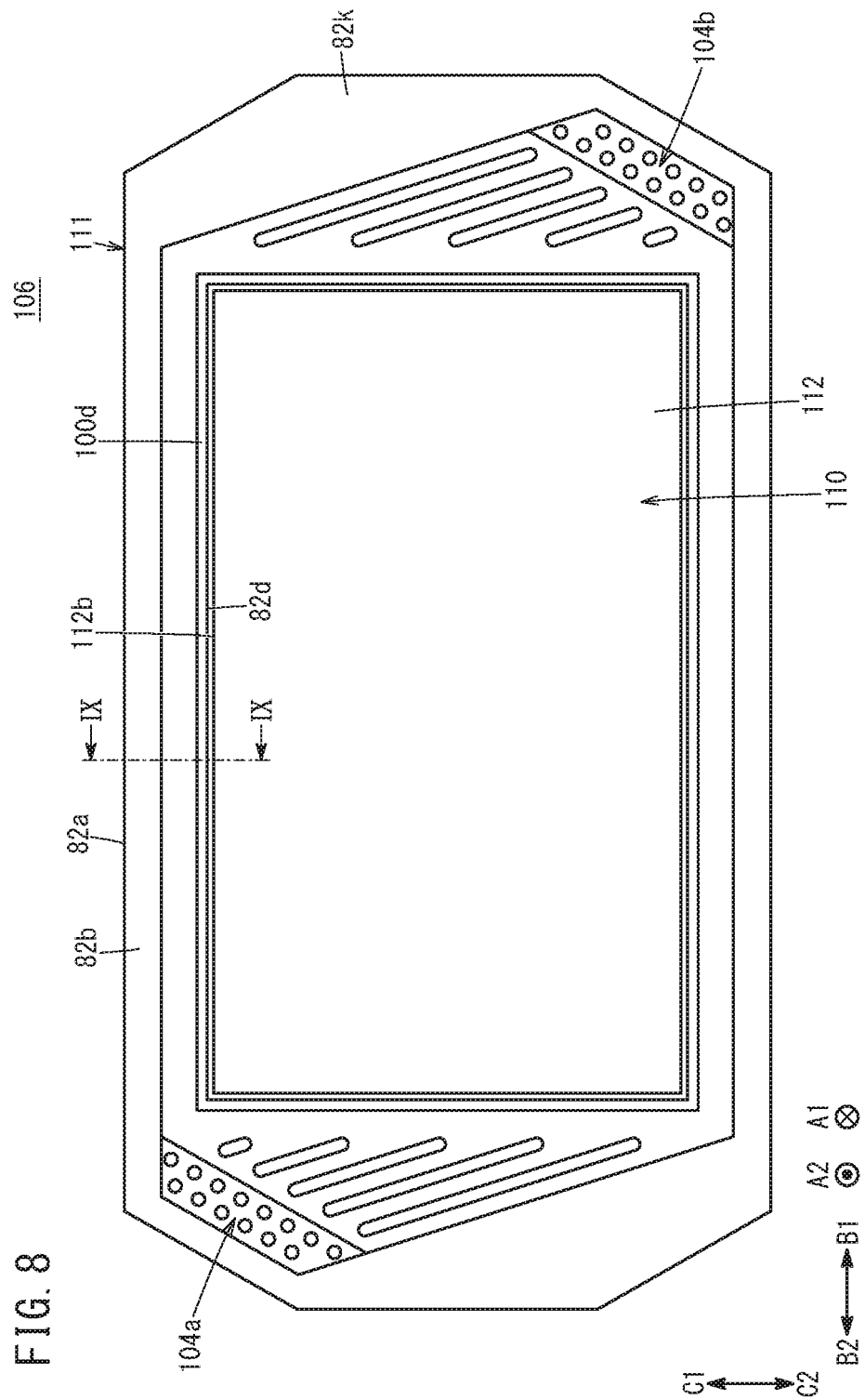
FIG. 8 is a front view of a resin frame equipped dummy structural body showing a side where a first electrically conductive porous body is present.
Figure 9:
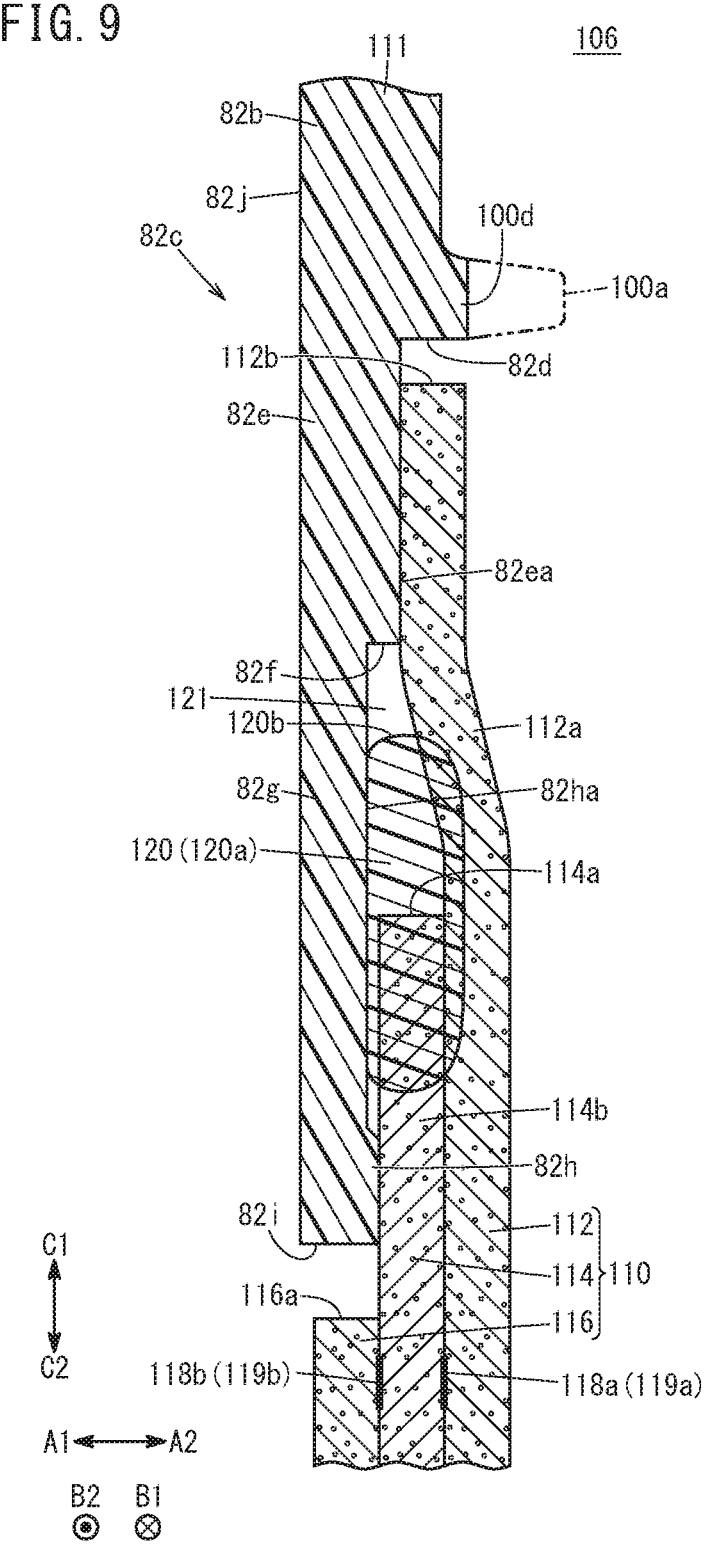
FIG. 9 is a cross sectional view taken along arrow lines IX-IX in FIG. 8.
Figure 10:
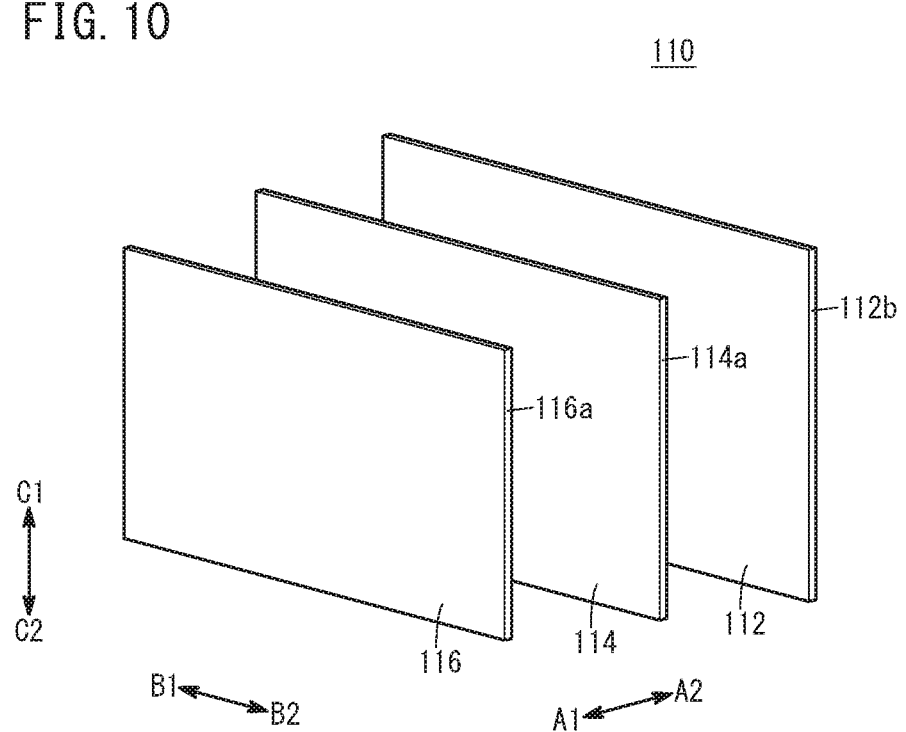
FIG. 10 is an exploded perspective view showing a dummy structural body.

As shown in FIGS. 8 and 9, the resin frame equipped dummy structural body 106 is formed by joining a dummy resin frame member 111 to the outer periphery of a dummy structural body 110. As shown in FIGS. 9 and 10, the dummy structural body 110 is formed by stacking, from the side indicated by the arrow A2 toward the side indicated by the arrow A1, three electrically conductive bodies, i.e., a first electrically conductive porous body 112, a second electrically conductive porous body 114, and a third electrically conductive porous body 116 each having a different surface size (surface area/outer size), in this order. The relationship of the surface size is: the first electrically conductive porous body 112>the second electrically conductive porous body 114>the third electrically conductive porous body 116.

Therefore, as shown in FIG. 9, a first outer peripheral portion 112a extending outside an outer peripheral end surface 114a of the second electrically conductive porous body 114 is provided over the entire periphery of the outer peripheral side of the first electrically conductive porous body 112. A second outer peripheral portion 114b extending outside an outer peripheral end surface 116a of the third electrically conductive porous body 116 is provided over the entire periphery of the outer peripheral side of the second electrically conductive porous body 114.

The first electrically conductive porous body 112, the second electrically conductive porous body 114, and the third electrically conductive porous body 116 are made of the same material, and may be formed by using the same material as the electrically conductive porous body of the first gas diffusion layer 92 or the second gas diffusion layer 96.

Further, in the embodiment of the present invention, the thickness of each of the first electrically conductive porous body 112, the second electrically conductive porous body 114, and the third electrically conductive porous body 116 has the same thickness as the electrically conductive porous body of the second gas diffusion layer 96. Therefore, by adjusting the surface size of the electrically conductive porous body, it is possible to obtain the dummy structural body 110 more easily.

As shown in FIG. 9, the first electrically conductive porous body 112 and the second electrically conductive porous body 114 that are stacked together are joined by an adhesive layer 118a interposed between the first electrically conductive porous body 112 and the second electrically conductive porous body 114. The second electrically conductive porous body 114 and the third electrically conductive porous body 116 that are stacked together are joined by an adhesive layer 118b interposed between the second electrically conductive porous body 114 and the third electrically conductive porous body 116. The adhesive layers 118a, 118b are formed by hardening adhesives 119a, 119b, respectively. Various types of adhesive may be adopted as the adhesive 119a and the adhesive 119b as in the case of the adhesive 98a.

The dummy resin frame member 111 may be made of the same material (not shown) as the material used in the resin frame member 82 of the resin frame equipped MEA 34 shown in FIGS. 3 and 7. That is, by removing a resin projection 100a of the resin frame member 82 by machining, etc. without thermally deforming the resin projection 100a as described above, it is possible to form the dummy resin frame member 111. Therefore, in the dummy resin frame member 111 and the dummy structural body 110, the above described joint portion 100 is not provided. The resin frame equipped dummy structural body 106 is formed by joining the dummy resin frame member 111 and the dummy structural body 110 together using an adhesive layer 120 instead of using the joint portion 100.

Specifically, as shown in FIG. 9, the dummy resin frame member 111 includes the outer peripheral frame 82b, the inner expansion 82c, and a remaining portion 100d formed after removing the front end of the resin projection 100a. It should be noted that, in the dummy resin frame member 111, the entire resin projection 100a may be removed. In this case, the remaining portion 100d is not formed.

The first outer peripheral portion 112a of the first electrically conductive porous body 112 and the second outer peripheral portion 114b of the second electrically conductive porous body 114 are positioned close to the inner periphery of the dummy resin frame member 111. That is, the shelf portion 82e of the inner expansion 82c contacts the side of the first outer peripheral portion 112a indicated by the arrow A1. The part of the first outer peripheral portion 112a on the side indicated by the arrow A1 and the part of the second outer peripheral portion 114b on the side indicated by the arrow A1 are positioned close to the thin portion 82g. The protruding end surface of the bank 82h contacts part of the second outer peripheral portion 114b on the side indicated by the arrow A1.

In the directions indicated by the arrows A1, A2, the outer peripheral end surface 114a of the second electrically conductive porous body 114 is disposed between the first electrically conductive porous body 112 and the thin portion 82g. In the surface direction of the dummy structural body 110, the inner peripheral end surface 82i of the dummy resin frame member 111 is positioned between the outer peripheral end surface 114a of the second electrically conductive porous body 114 and the outer peripheral end surface 116a of the third electrically conductive porous body 116. The outer peripheral end surface 116a of the third electrically conductive porous body 116 is positioned close to the inner peripheral end surface 82i of the dummy resin frame member 111 at a distance. The thickness of the second electrically conductive porous body 114 is larger than the height of the second stepped surface 82f.

The dummy structural body 110 and the dummy resin frame member 111 are provided with the adhesive layer 120 in a manner that, in the surface direction of the dummy structural body 110, the adhesive layer 120 extends toward inside and outside from the outer peripheral end surface 114a of the second electrically conductive porous body 114. The first outer peripheral portion 112a and the second outer peripheral portion 114b are adhered to the inner periphery of the dummy resin frame member 111 by this adhesive layer 120.

In the stacking direction (directions indicated by the arrows A1 and A2, thickness direction) of the dummy structural body 110, the adhesive layer 120 is formed by hardening an adhesive 120a impregnated into the entire second electrically conductive porous body 114 and part of the first electrically conductive porous body 112 positioned close to the second electrically conductive porous body 114 (the side indicated by the arrow A1). Preferably, the adhesive layer 120 is formed by hardening thermosetting resin. That is, preferably, the adhesive 120a is thermosetting resin. However, the adhesive 120a is not limited specially in this respect. Various types of adhesive may be adopted as the adhesive 120a as in the case of the adhesive 98a.

In the surface direction of the thin portion 82g, the adhesive layer 120 is provided in the groove 82ha provided between the second stepped surface 82f and the bank 82h, at a distance from each of the second stepped surface 82f and the bank 82h. That is, in the surface direction of the dummy structural body 110, the adhesive layer 120 is provided inside an outer peripheral end surface 112b of the first electrically conductive porous body 112. Therefore, an end 120b of the adhesive layer 120 in the surface direction is positioned close to a gap 121 formed between the first outer peripheral portion 112a and the thin portion 82g in the directions indicated by the arrows A1, A2.

The adhesive layer 120 may be provided around portion of the dummy structural body 110 adjacent to the outer peripheral end surface 114a, or may be provided in the circumferential direction of the dummy structural body intermittently (in a spot pattern).

Figure 11:
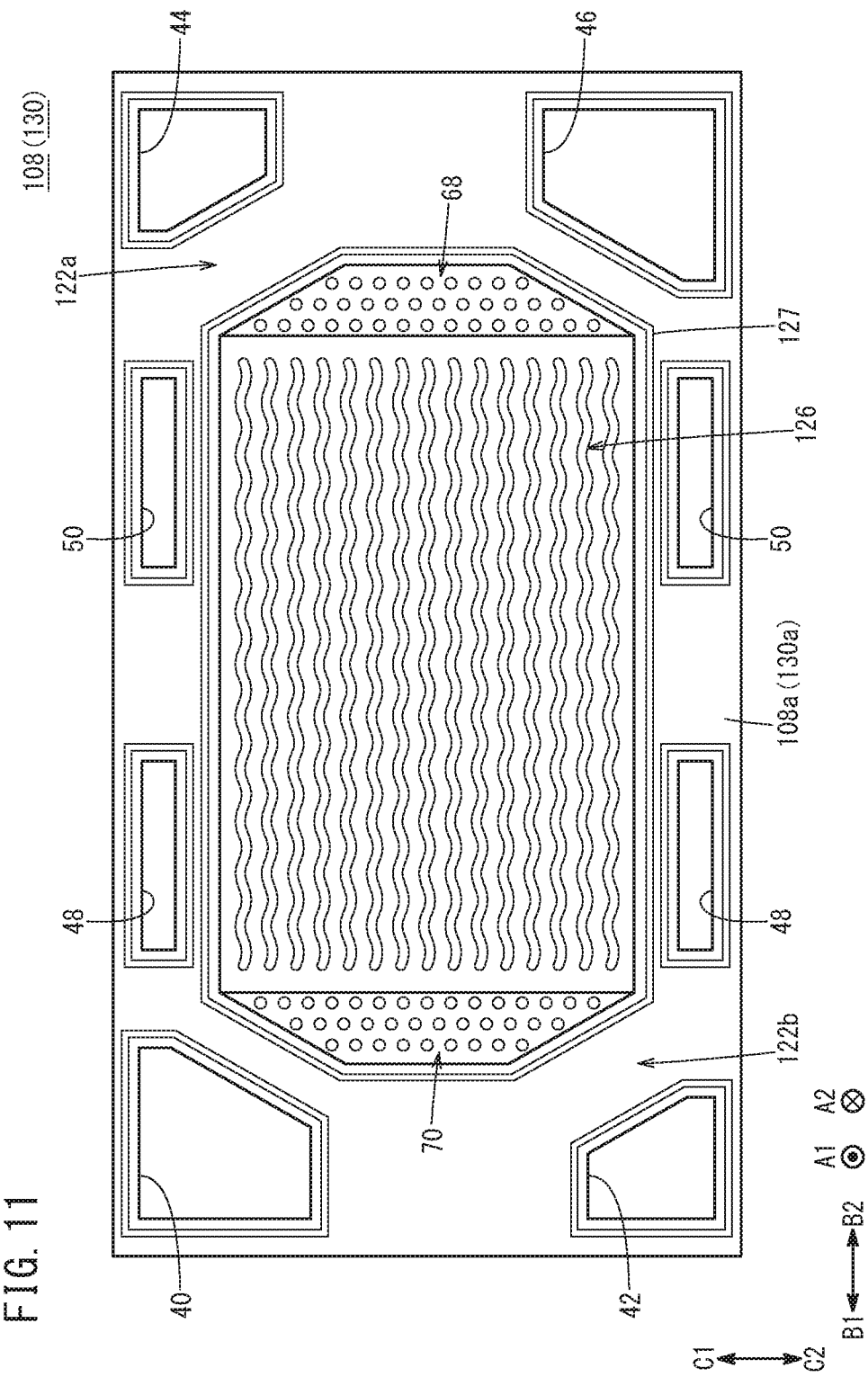
FIG. 11 is a front view of a dummy second separator showing a side where a second space is present.

As shown in FIG. 11, the dummy second separator 108 has the same structure as the second separator 36 (see FIG. 3) except that an inlet disconnecting section 122a is provided instead of the fuel gas supply holes 72a (see FIG. 3), and an outlet disconnecting section 122b is provided instead of the fuel gas discharge holes 72b (see FIG. 3).

That is, a surface 108b of the dummy second separator 108 at the other end (side indicated by the arrow A2, FIG. 2) has the same structure as the surface 36b of the second separator 36 on the side indicated by the arrow A2 except that the fuel gas supply holes 72a and the fuel gas discharge holes 72b surrounded by the seal member 71 (FIG. 5) are not provided. Therefore, the surface 108b of the dummy second separator 108 has the same structure as the surface 32b of the first separator 32 at the other end (side indicated by the arrow A2) shown in FIG. 4.

As shown in FIG. 2, the first space 109 corresponding to the oxygen-containing gas flow field 56 is provided between the surface 108b of the dummy second separator 108 at the other end (side indicated by the arrow A2) and the cathode 86 side of the resin frame equipped MEA 34 (side indicated by the arrow A1).

As shown in FIGS. 2 and 11, a second space 126 corresponding to the fuel gas flow field 66 is provided between a surface 108a of the dummy second separator 108 at one end (side indicated by the arrow A1) and the other end (side indicated by the arrow A2) of the resin frame equipped dummy structural body 106. The second space 126 is disconnected from the fuel gas supply passage 44 by the inlet disconnecting section 122a, and disconnected from the fuel gas discharge passage 42 by the outlet disconnecting section 122b. That is, since the inlet disconnecting section 122a and the outlet disconnecting section 122b (hereinafter, the inlet disconnecting section 122a and the outlet disconnecting section 122b are also referred to as the disconnecting section(s), collectively) limit flow of the fuel gas into the second space 126, a heat insulating space is formed inside the second space 126.

It should be noted that only one of the inlet disconnecting section 122a and the outlet disconnecting section 122b may be provided to limit the flow of the fuel gas into the second space 126 to form the heat insulating space. Further, in the embodiment of the present invention, the disconnecting section may be formed by adopting structure where the fuel gas supply holes 72a and the fuel gas discharge holes 72b (see FIG. 3) do not penetrate through the dummy second separator 108. However, the present invention is not limited specifically in this respect. For example, the disconnecting section may have structure where, though the fuel gas supply holes 72a and the fuel gas discharge holes 72b penetrate through the dummy second separator 108, the fuel gas supply holes 72a and the fuel gas discharge holes 72b are closed. As shown in FIG. 11, the surface 108a of the dummy second separator 108 is provided with a seal member 127 around the second space 126 to provide sealing between the inside of the outside of the seal member 127 in the surface direction.

As shown in FIG. 2, the first dummy cell 18 is formed by stacking, from the side indicated by the arrow A1 toward the side indicated by the arrow A2, a dummy first separator 105, a resin frame equipped dummy structural body 106, a dummy second separator 108, a resin frame equipped dummy structural body 106, and a dummy third separator 130 together in this order.

A surface 130b of the dummy third separator 130 at the other end (side indicated by the arrow A2) has the same structure as the surface 32a of the first separator 32 at one end (side indicated by the arrow A1) shown in FIG. 3. Further, as shown in FIG. 11, a surface 130a of the dummy third separator 130 on the side indicated by the arrow A1 has the same structure as the surface 108a of the dummy second separator 108 on the side indicated by the arrow A1.

As shown in FIG. 2, the coolant flow field 52 is provided between the surface 130b of the dummy third separator 130 on the side indicated by the arrow A2 and the dummy first separator 105 of the first end power generation unit 16. As shown in FIGS. 2 and 11, the second space 126 corresponding to the fuel gas flow field 66 is provided between the surface 130a of the dummy third separator 130 on the side indicated by the arrow A1 and the other end (side indicated by the arrow A2) of the resin frame equipped dummy structural body 106. Further, in the first dummy cell 18, the second space 126 is provided between the surface 108a of the dummy second separator 108 on the side indicated by the arrow A1 and the other end (side indicated by the arrow A2) of the resin frame equipped dummy structural body 106.

Further, in the first dummy cell 18, the first space 109 is formed at each of the positions between the surface 105b of the dummy first separator 105 on the side indicated by the arrow A2 and part of the resin frame equipped dummy structural body 106 on the side indicated by the arrow A1, and between the surface 108b of the dummy second separator 108 on the side indicated by the arrow A2 and part of the resin frame equipped dummy structural body 106 on the side indicated by the arrow A1.

The second dummy cell 20 is formed by stacking, from the side indicated by the arrow A1 toward the side indicated by the arrow A2, a dummy first separator 105, the resin frame equipped dummy structural body 106, and the dummy third separator 130 together in this order. Therefore, in the second dummy cell 20, the first space 109 is provided between the surface 105b of the dummy first separator 105 on the side indicated by the arrow A2 and part of the resin frame equipped dummy structural body 106 on the side indicated by the arrow A1. Further, the second space 126 is provided between the surface 130a of the dummy third separator 130 on the side indicated by the arrow A1 and part of the resin frame equipped dummy structural body 106 on the side indicated by the arrow A2. The third dummy cell 24 has the same structure as the second dummy cell 20.

The separators which can form the second dummy cell 20 and the third dummy cell 24 are not limited to have the above structure. For example, the second dummy cell 20 may be formed by stacking, from the side indicated by the arrow A1 toward the side indicated by the arrow A2, the dummy second separator 108, the resin frame equipped dummy structural body 106, and the first separator 32 together in this order. The third dummy cell 24 may be formed by stacking, from the side indicated by the arrow A1 toward the side indicated by the arrow A2, the first separator 32, the resin frame equipped dummy structural body 106, and the dummy second separator 108 together in this order.

The second end power generation unit 22 is formed by stacking, from the side indicated by the arrow A1 toward the side indicated by the arrow A2, the first separator 32, the resin frame equipped MEA 34, the dummy second separator 108, the resin frame equipped dummy structural body 106, and the dummy third separator 130 together in this order. Therefore, in the second end power generation unit 22, the first space 109 is formed between the surface 108b of the dummy second separator 108 on the side indicated by the arrow A2 and part of the resin frame equipped dummy structural body 106 on the side indicated by the arrow A1. Further, the second space 126 is formed between the surface 130a of the dummy third separator 130 on the side indicated by the arrow A1 and part of the resin frame equipped dummy structural body 106 on the side indicated by the arrow A2.

The terminal plates 26a, 26b are made of electrically conductive material. For example the terminal plates 26a, 26b are made of metal such as copper, aluminum, or stainless steel. As shown in FIG. 1, terminal units 132a, 132b extending outward in the stacking direction are provided at substantially centers of the terminal plates 26a, 26b.

The terminal unit 132a is inserted into an insulating cylindrical body 134a to penetrate through a hole 136a of the insulator 28a and a hole 138a of the end plate 30a to protrude to the outside of the end plate 30a. The terminal unit 132b is inserted into an insulating cylindrical body 134b. The terminal unit 132b penetrates through a hole 136b of the insulator 28b and a hole 138b of the end plate 30b, and protrudes to the outside of the end plate 30b.

The insulators 28a, 28b are made of insulating material such as polycarbonate (PC) resin, phenol resin, etc. Recesses 140a, 140b are formed at the centers of the insulators 28a, 28b. The recesses 140a, 140b are opened toward the stack body 14. The recesses 140a, 140b are connected to the holes 136a, 136b.

Reactant gas passages are provided in the insulator 28a and the end plate 30a. The coolant supply passages 48 and the coolant discharge passages 50 are provided in the insulator 28b and the end plate 30b.

The terminal plate 26a and a heat insulating body 142 are accommodated in the recess 140a. The terminal plate 26b and the heat insulating body 142 are accommodated in the recess 140b. The heat insulating body 142 is formed by sandwiching an electrically conductive heat insulating member 146 between a pair of electrically conductive heat insulating plates 144. For example, the heat insulating plates 144 are porous carbon plates having a flat shape, and the heat insulating member 146 is a metal plate having a corrugated shape in cross section.

The heat insulating plate 144 and the heat insulating member 146 may be made of the same material. Further, the heat insulating body 142 may have a single heat insulating plate 144 and a single heat insulating member 146. Further, a resin spacer (not shown) may be interposed between the terminal plates 26a, 26b and the bottoms of the recesses 140a, 140b of the insulators 28a, 28b.

The fuel cell stack 10 basically has the above structure. Hereinafter, a method of producing a dummy cell according to the embodiment of the present invention will be described taking a case of obtaining the first dummy cell 18 of the fuel cell stack 10 as an example.

Figure 12:
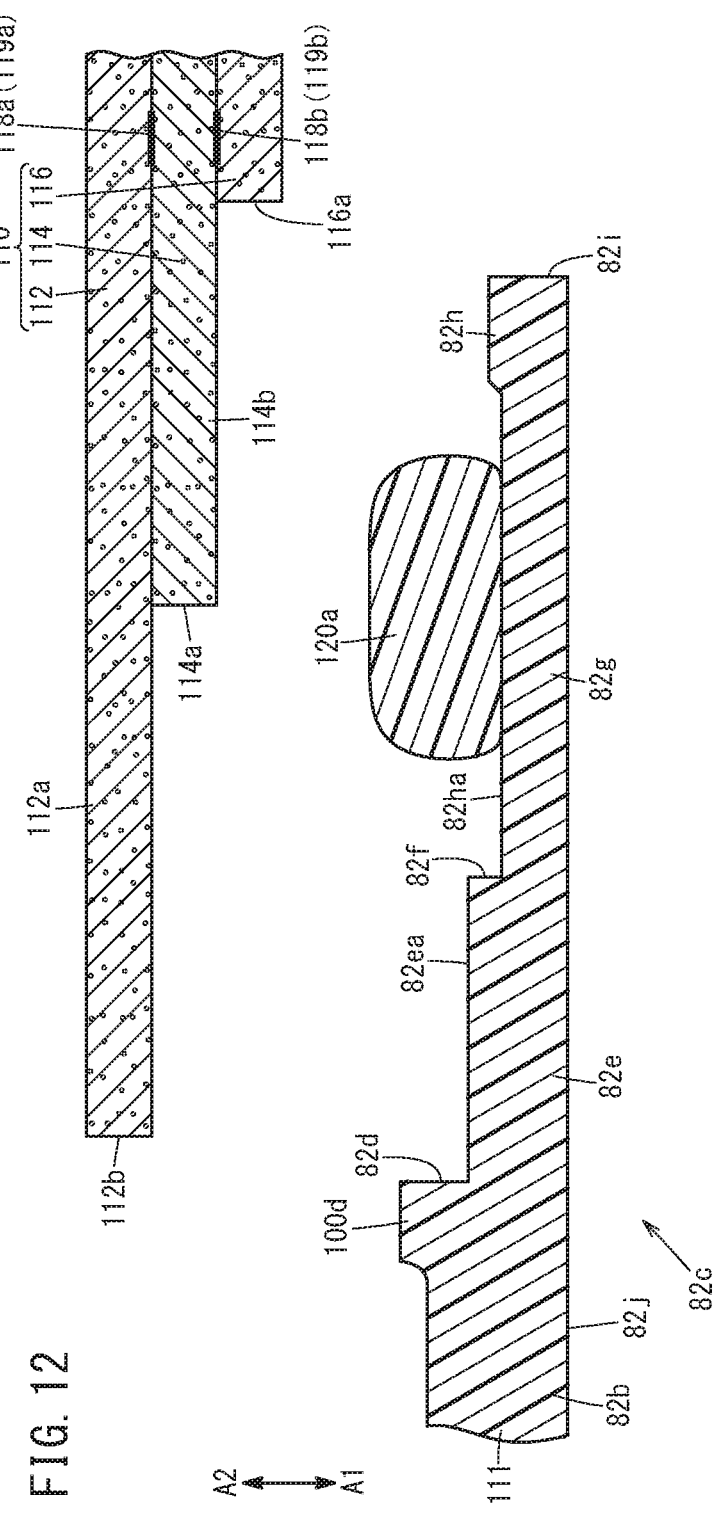
FIG. 12 is a view illustrating a dummy structural body obtained in a dummy structural body forming step, and inner periphery of a dummy resin frame member provided with adhesive.

First, as shown in FIGS. 10 and 12, the first electrically conductive porous body 112, the second electrically conductive porous body 114, and the third electrically conductive porous body 116 are stacked together in this order to perform a dummy structural body forming step of obtaining the dummy structural body 110. Specifically, as shown in FIG. 12, the first electrically conductive porous body 112 and the second electrically conductive porous body 114 are stacked together through the adhesive 119a, and the second electrically conductive porous body 114 and the third electrically conductive porous body 116 are stacked together through the adhesive 119b. Then, the adhesive 119a and the adhesive 119b are hardened to form the adhesive layers 118a, 118b, respectively, and thereby the first electrically conductive porous body 112, the second electrically conductive porous body 114, and the third electrically conductive porous body 116 are joined together to obtain the dummy structural body 110. It should be noted that the adhesive layers 118a, 118b may be provided around the dummy structural body 110, or may be provided intermittently (in a spot pattern) in a circumferential direction.

Figure 13:
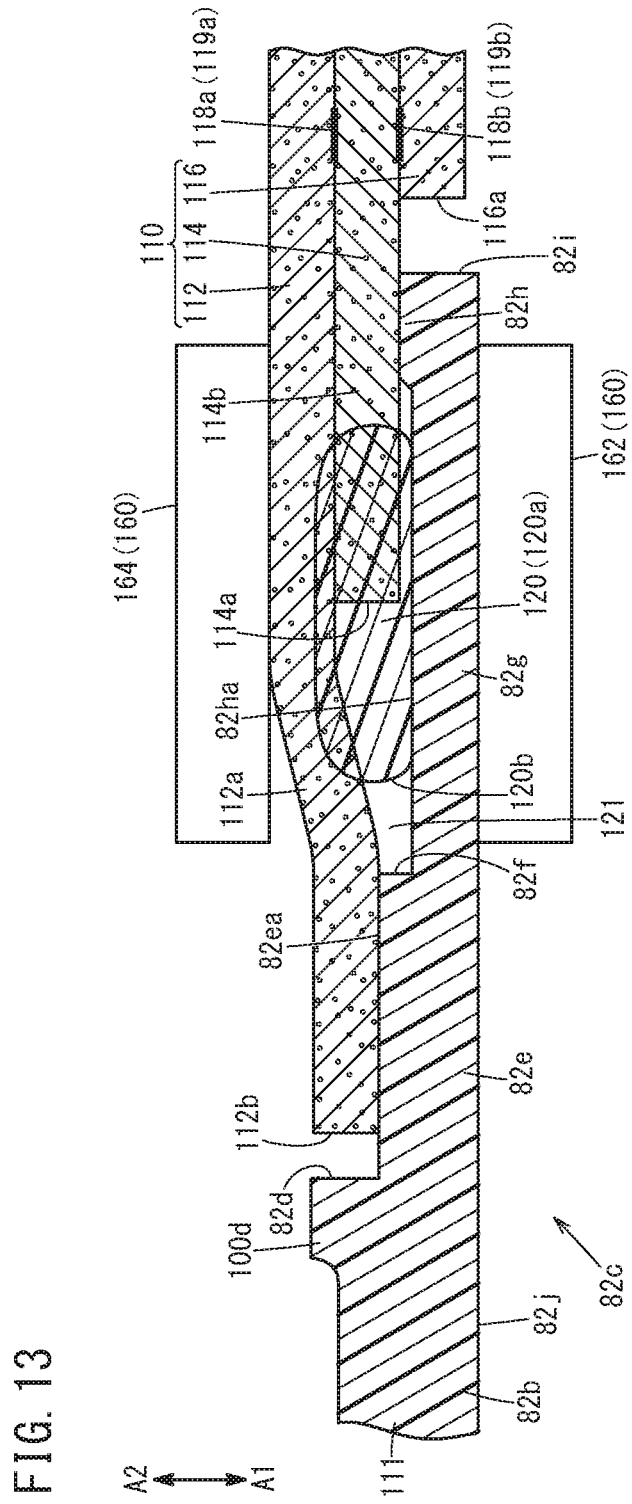
FIG. 13 is a view illustrating a method of joining the dummy structural body and the dummy resin frame member in FIG. 12 together.

Next, as shown in FIGS. 12 and 13, a joining step of joining the dummy structural body 110 and the dummy resin frame member 111 together is performed by positioning the inner periphery of the dummy resin frame member 111 close to the first outer peripheral portion 112a of the first electrically conductive porous body 112 and the second outer peripheral portion 114b of the second electrically conductive porous body 114. In the joining step, the adhesive layer 120 is formed by hardening the adhesive 120a interposed between the first outer peripheral portion 112a and the second outer peripheral portion 114b and the inner periphery of the dummy resin frame member 111.

For this purpose, first, as shown in FIG. 12, the adhesive 120a is disposed in the groove 82ha of the dummy resin frame member 111 at a distance from each of the second stepped surface 82f and the bank 82h. Next, as shown in FIG. 13, the first outer peripheral portion 112a and the second outer peripheral portion 114b of the dummy structural body 110 are stacked on the inner periphery of the dummy resin frame member 111 where the adhesive 120a is disposed.

Specifically, the first outer peripheral portion 112a of the first electrically conductive porous body 112 on the side indicated by the arrow A1 is stacked on the shelf portion 82e of the dummy resin frame member 111. Further, part of the second outer peripheral portion 114b of the second electrically conductive porous body 114 on the side indicated by the arrow A1 is positioned close to the thin portion 82g of the dummy resin frame member 111, and made to contact the protruding end surface of the bank 82h. Further, the outer peripheral end surface 116a of the third electrically conductive porous body 116 is positioned to face the inner peripheral end surface 82i of the dummy resin frame member 111.

In this manner, in the stacking direction (thickness direction) of the dummy structural body 110, the adhesive 120a is impregnated into the entire second electrically conductive porous body 114 and part of the first electrically conductive porous body 112 positioned close to the second electrically conductive porous body 114. In this regard, in the surface direction of the dummy structural body 110, the position and the quantity of the adhesive 120a are adjusted in a manner to provide the adhesive 120a inside the outer peripheral end surface 112b of the first electrically conductive porous body 112. In the structure, a gap 121 is formed between the first electrically conductive porous body 112 and the dummy resin frame member 111 in the stacking direction, outside the portion where the adhesive 120a is interposed in the surface direction, i.e., between the second stepped surface 82f and the adhesive 120a in the surface direction of the thin portion 82g.

Next, the dummy structural body 110 and the dummy resin frame member 111 stacked together in a manner that the adhesive 120a is interposed between the dummy structural body 110 and the dummy resin frame member 111 as described above is subjected to hot pressing, e.g., using a joining device 160 for thermally hardening the adhesive 120a to form the adhesive layer 120. The joining device 160 includes a fixed mold 162 (mold) and a movable mold 164 (mold) which is movable back and forth relative to the fixed mold 162.

After the dummy structural body 110 and the dummy resin frame member 111 stacked together as described above are placed on the fixed mold 162, the movable mold 164 is moved closer to the fixed mold 162 in the state where the movable mold 164 is heated to a predetermined temperature. Therefore, at least a peripheral portion of the adhesive 120a on the dummy structural body 110 and the dummy resin frame member 111 is held between the fixed mold 162 and the movable mold 164 to apply heat and pressure to the adhesive 120a.

As a result, as shown in FIG. 9, the adhesive 120a is thermally hardened to form the adhesive layer 120. In this regard, the state where the above gap 121 is formed between the first electrically conductive porous body 112 and the dummy resin frame member 111 is maintained. The first outer peripheral portion 112a and the second outer peripheral portion 114b, and the dummy resin frame member 111 are adhered to each other through the adhesive layer 120 to join the dummy structural body 110 and the dummy resin frame member 111 together. Thus, the resin frame equipped dummy structural body 106 is obtained.

After the two resin frame equipped dummy structural bodies 106 are obtained through the above step, as shown in FIG. 2, the dummy first separator 105, the frame equipped dummy structural body 106, the dummy second separator 108, the resin frame equipped dummy structural body 106, and the dummy third separator 130 are stacked together in this order to form the first dummy cell 18.

The second dummy cell 20 and the third dummy cell 24 can be obtained by sandwiching the resin frame equipped dummy structural body 106 between the dummy first separator 105 and the dummy third separator 130.

Operation of the fuel cell stack 10 including the first dummy cell 18, the second dummy cell 20, and the third dummy cell 24 obtained as described above will be described below. First, as shown in FIG. 1, the oxygen-containing gas is supplied to the oxygen-containing gas supply passage 40 of the end plate 30a. A fuel gas such as a hydrogen-containing gas is supplied to the fuel gas supply passage 44 of the end plate 30a. A coolant such as pure water, ethylene glycol, oil is supplied to each of the coolant supply passages 48 of the end plate 30b.

As shown in FIGS. 4 and 5, the oxygen-containing gas supplied to the oxygen-containing gas supply passage 40 flows into the oxygen-containing gas flow field 56 and the first space 109 through the connection channel 125 formed inside the inlet connection groove 62a. As a result, while the oxygen-containing gas moves in the directions indicated by the arrows B1 and B2, the oxygen-containing gas is supplied to the cathode 86 of each of the membrane electrode assemblies 80 and the dummy structural body 110.

As shown in FIG. 3, the fuel gas supplied to the fuel gas supply passage 44 flows into the fuel gas flow fields 66 of the second separator 36 and the third separator 38, respectively, through the fuel gas supply holes 72a. As a result, while the fuel gas moves in the directions indicated by the arrows B1 and B2, the fuel gas is supplied to the anode 88 of each of the membrane electrode assemblies 80. In the meanwhile, as shown in FIG. 11, entry of the fuel gas into the second space 126 of the dummy second separator 108 and the dummy third separator 130 is blocked by the inlet disconnecting section 122a.

After the reactant gases are supplied to the membrane electrode assembly 80 as described above, the oxygen-containing gas supplied to each of the cathodes 86 and the fuel gas supplied to each of the anodes 88 are partially consumed in electrochemical reactions in the first electrode catalyst layer 90 and the second electrode catalyst layer 94 to perform power generation.

Then, after the oxygen-containing gas is supplied to, and partially consumed at each of the cathodes 86, the oxygen-containing gas is discharged from each of the oxygen-containing gas flow field 56 and the first space 109 to the oxygen-containing discharge passage 46 through the connection channel 125 formed inside the outlet connection grooves 62b. Then, the oxygen-containing gas is discharged to the outside of the fuel cell stack 10 through the oxygen-containing gas discharge passage 46 of the end plate 30a.

Likewise, after the fuel gas is supplied to, and partially consumed at each of the anodes 88, the fuel gas is discharged from the fuel gas flow field 66 into the fuel gas discharge passage 42 through the inside of the fuel gas discharge holes 72b. Then, the fuel gas is discharged to the outside of the fuel cell stack 10 through the fuel gas discharge passage 42 of the end plate 30a.

In this regard, as shown in FIG. 11, the second space 126 is disconnected from the fuel gas discharge passage 42 as well by the outlet disconnecting section 122b. Therefore, as described above, the flow of the fuel gas into the second space 126 is disconnected by the inlet disconnecting section 122a, and entry of the fuel gas into the second space 126 from the fuel gas discharge passage 42 is avoided by the outlet disconnecting section 122b. As a result, flow of the fuel gas through the second space 126 is disconnected by the disconnecting section, and the second space 126 functions as a heat insulating space.

Further, as shown in FIG. 2, the coolant supplied to each of the coolant supply passages 48 flows into the coolant flow field 52 between the dummy first separator 105 and the dummy third separator 130 that are adjacent to each other, and the coolant flow field 52 between the first separator 32 and the third separator 38 that are adjacent to each other. As shown in FIG. 3, the coolant supplied from the coolant supply passage 48 on the side indicated by the arrow C1 and the coolant supplied from the coolant supply passage 48 on the side indicated by the arrow C2 flow toward each other in the direction indicated by the arrow C1, C2, and then, the coolant flows in the direction indicated by the arrow B2. Then, while the coolant cools the membrane electrode assembly 80, the coolant flows in the directions indicated by the arrows C1, C2 away from each other, and then, the coolant is discharged from each of the coolant discharge passages 50.

As described above, each of the dummy cells (the first dummy cell 18, the second dummy cell 20, and the third dummy cell 24) of the fuel cell stack 10 according to the embodiment of the present invention includes the dummy structural body 110 corresponding to the membrane electrode assembly 80 of the power generation cell 12. That is, since each of the dummy cells does not include the electrolyte membrane 84, and the first electrode catalyst layer 90 and the second electrode catalyst layer 94, power generation is not performed, and thus, no water is produced. As a result, each of the dummy cells itself functions as a heat insulating layer, and it is possible to suppress condensation of each of the dummy cells.

The first dummy cell 18 and the second dummy cell 20 having the above structure are provided at one end of the stack body 14 in the direction indicated by the arrow A1, and the third dummy cell 24 is provided at the end of the stack body 14 in the direction indicated by the arrow A2. In the structure, it is possible to improve heat insulating performance at the end of the stack body 14. Therefore, even under the low temperature environment, it is possible to eliminate or reduce the situation where the temperature at the ends of the stack body 14 becomes low in comparison with the central side.

Further, since it is possible to improve the heat insulating performance at the ends of the stack body 14, even in the case of starting operation of starting the fuel cell stack 10 at the freezing temperature or less, it is possible to effectively increase the temperature of the entire stack body 14. In this manner, it is possible to eliminate, or reduce the situation where water, etc. produced in power generation is frozen in the vicinity of the ends of the stack body 14, and voltage decreases.

In each of the dummy cells, the dummy structural body 110 and the dummy resin frame member 111 are joined together through the adhesive layer 120 which adheres the first outer peripheral portion 112a, the second outer peripheral portion 114b, and the dummy resin frame member 111 to each other. In each of the dummy cells obtained in this manner, for example, part of the dummy resin frame member 111 is melted, and impregnated into the dummy structural body 110. As a result, it becomes possible to produce the dummy cell accurately and efficiently in comparison with the dummy cell (not shown) obtained by joining the dummy structural body 110 and the dummy resin frame member 111 together.

That is, in the case where part of the dummy resin frame member 111 is melt, and the dummy resin frame member 111 and the dummy structural body 110 are joined together, it is necessary to heat part of the dummy resin frame member 111 up to the softening temperature or more, to change it into the melted resin. Further, it is necessary to decrease the temperature of the melted resin impregnated into the dummy structural body 110 from the above high temperature to the solidifying temperature.

In contrast, in the case of joining the dummy structural body 110 and the dummy resin frame member 111 together through the adhesive layer 120, it is not necessary to heat the dummy resin frame member 111 up to the above high temperature. Therefore, it is possible to suppress warpage, etc. due to temperature increase in the dummy resin frame member 111, and produce each of the dummy cells highly accurately. Further, it is possible to harden the adhesive 120a, and form the adhesive layer 120 in a short period of time, in comparison with the wait time until the dummy resin frame member 111 is heated, and changed into melted resin, and the wait time until the temperature of the melted resin is decreased from the high temperature to solidify the melted resin. Therefore, it is possible to reduce the time required for joining the dummy resin frame member 111 and the dummy structural body 110 together, and produce each of the dummy cells efficiently.

As described above, in the fuel cell stack 10 according to the embodiment of the present invention, it is possible to improve the power generation stability by each of the dummy cells which can be produced highly accurately and efficiently. Further, in the method of producing the dummy cell according to the embodiment of the present invention, it is possible to highly accurately, and efficiently produce the dummy cells which make it possible to improve the power generation stability of the fuel cell stack 10.

In the fuel cell stack 10 according to the above embodiment, in the surface direction of the dummy structural body 110, the adhesive layer 120 extends toward inside and outside from the outer peripheral end surface 114a of the second electrically conductive porous body 114.

Further, in the joining step in the method of producing the dummy cell according to the above embodiment, in the surface direction of the dummy structural body 110, the adhesive layer 120 extending from the outer peripheral end surface 114a of the second electrically conductive porous body 114 toward inside and outside is formed.

In these cases, since it is possible to adhere each of the first outer peripheral portion 112a and the second outer peripheral portion 114b to the inner periphery of the dummy resin frame member 111 by the single piece of adhesive layer 120, it becomes possible to produce each of the dummy cells more easily and efficiently. It should be noted that the adhesive layer 120 which adheres the first outer peripheral portion 112a and the inner periphery of the dummy resin frame member 111 to each other and the adhesive layer 120 which adheres the second outer peripheral portion 114b and the inner periphery of the dummy resin frame member 111 to each other may be separated from each other.

In the fuel cell stack 10 according to the above embodiment, in the surface direction of the dummy structural body 110, the adhesive layer 120 is provided inside the outer peripheral end surface 112b of the first electrically conductive porous body 112, and the outer end 120b of the adhesive layer 120 in the surface direction is positioned close to the gap 121 formed between the first electrically conductive porous body 112 and the dummy resin frame member 111.

Further, in the joining step in the method of producing the dummy cell according to the above embodiment, in the surface direction of the dummy structural body 110, the adhesive 120a is provided inside the outer peripheral end surface 112b of the first electrically conductive porous body 112, and the adhesive layer 120 is formed while maintaining a state where the gap 121 is formed outside portion where the adhesive 120a is interposed between the first electrically conductive porous body 112 and the dummy resin frame member 111.

In these cases, by the gap 121, since it is possible to easily eliminate or reduce the situation where the adhesive layer 120 protrudes to the outside of the dummy structural body 110 in the surface direction, it becomes possible to obtain each of the dummy cells more accurately and efficiently.

In the fuel cell stack 10 according to the above embodiment, in the stacking direction of the dummy structural body 110, the adhesive layer 120 is formed by hardening the adhesive 120a impregnated into the entire second electrically conductive porous body 114 and part of the first electrically conductive porous body 112 positioned close to the second electrically conductive porous body 114.

Further, in the joining step in the method of producing the dummy cell according to the above embodiment, by stacking the first outer peripheral portion 112a and the second outer peripheral portion 114b on the inner periphery of the dummy resin frame member 111 where the adhesive 120a is disposed, the adhesive 120a is impregnated into the entire second electrically conductive porous body 114 and part of the first electrically conductive porous body 112 positioned close to the second electrically conductive porous body 114 in the stacking direction of the dummy structural body 110, and the adhesive 120a is hardened to form the adhesive layer 120.

In these cases, it becomes possible to effectively adhere the dummy structural body 110 and the dummy resin frame member 111 to each other with sufficient strength without increasing the quantity of the adhesive 120a required for forming the adhesive layer 120. Further, since it is possible to avoid adhesion of the adhesive 120a to the movable mold 164, it is possible to improve the production efficiency of each of the dummy cells. It should be noted that the thickness of the part impregnated with the adhesive 120a of each of the first electrically conductive porous body 112 and the second electrically conductive porous body 114 is not limited to the above specially.

In the fuel cell stack 10 according to the above embodiment, the dummy resin frame member 111 includes the outer peripheral frame 82b, the shelf portion 82e protruding inward over the entire periphery from the inner peripheral portion of the outer peripheral frame 82b through the first stepped surface 82d, and the thin portion 82g protruding inward over the entire periphery from the inner peripheral portion of the shelf portion 82e through the second stepped surface 82f. The outer periphery of the first outer peripheral portion 112a is stacked on the shelf portion 82e, and the second outer peripheral portion 114b is positioned close to the thin portion 82g, and the outer peripheral end surface 116a of the third electrically conductive porous body 116 faces the inner peripheral end surface 82i of the dummy resin frame member 111.

In the fuel cell stack 10 according to the above embodiment, the bank 82h protruding toward the second electrically conductive porous body 114 is provided over the entire periphery of the inner peripheral portion of the thin portion 82g, and the protruding end surface of the bank 82h and the second electrically conductive porous body 114 contact each other. In this case, by the bank 82h, since it becomes possible to easily eliminate or reduce the situation where the adhesive layer 120 is formed to protrude toward inside of the dummy structural body 110 in the surface direction, it becomes possible to obtain each of the dummy cells more accurately and efficiently.

In the fuel cell stack 10 according to the above embodiment, in the surface direction of the thin portion 82g, the adhesive layer 120 is provided in the groove 82ha provided between the second stepped surface 82f and the bank 82h, at a distance from each of the second stepped surface 82f and the shelf portion 82e. In this case, since it is possible to more reliably eliminate or reduce the situation where the adhesive layer 120 protrudes toward outside and inside of the dummy structural body 110 in the surface direction, it becomes possible to obtain each of the dummy cells more accurately and efficiently.

In the fuel cell stack 10 according to the above embodiment, the thickness of the second electrically conductive porous body 114 is larger than the height of the second stepped surface 82f. As described above, by increasing the thickness of the second electrically conductive porous body 114, it becomes possible to impregnate the sufficient quantity of the adhesive 120a. Therefore, it becomes possible to adhere the dummy structural body 110 and the dummy resin frame member 111 to each other with higher strength.

In the fuel cell stack 10 according to the above embodiment, the adhesive layer 120 is formed by hardening thermosetting resin.

Further, in the joining step in the method of producing the dummy cell according to the above embodiment, the dummy structural body 110 and the dummy resin frame member 111 provided with the adhesive 120a between the dummy structural body 110 and the dummy resin frame member 111 are held between the fixed mold 162 and the movable mold 164 (molds), and the adhesive 120a comprising thermosetting resin is thermally hardened to form the adhesive layer 120.

In these cases, it is possible to simply and rapidly harden the adhesive 120a, and obtain the adhesive layer 120 having excellent heat resistance and joining strength.

The present invention is not limited to the above embodiment. Various modifications may be made without departing from the gist of the present invention.

In the fuel cell stack 10 according to the above embodiment, the first end power generation unit 16, the first dummy cell 18, and the second dummy cell 20 are stacked together on the side of the stack body 14 indicated by the arrow A1, and the second end power generation unit 22 and the third dummy cell 24 are stacked together on the side of the stack body 14 indicated by the arrow A2.

As described above, the number of dummy cells provided on the stack body 14 on the side indicated by the arrow A2 (outlet side of the oxygen-containing gas) is larger than that provided on the stack body 14 on the side indicated by the arrow A1 (inlet side of the oxygen-containing gas). Therefore, it is possible to effectively suppress entry of the condensed water into the power generation cell 12. However, it is sufficient that the fuel cell stack 10 includes the dummy cell at least at one end of the stack body 14 in the stacking direction. The number of dummy cells is not limited specially as well.

Further, the first end power generation unit 16 or the second end power generation unit 22 is interposed between the power generation cell 12 and the first dummy cell 18 or the third dummy cell 24. In this manner, it becomes possible to cool the membrane electrode assemblies 80 in the first end power generation unit 16 and the second end power generation unit 22 for performing power generation at both ends in the stacking direction of the stack body 14, under the same condition as the other membrane electrode assemblies 80. As a result, since it is possible to ensure that the balance between heat generation and cooling becomes uniform over the entire stack body 14, and it is possible to achieve further improvement in the power generation performance and the power generation stability.

However, the first end power generation unit 16 and the second end power generation unit 22 are not essential constituent elements. The fuel cell stack 10 may include only one of the first end power generation unit 16 and the second end power generation unit 22, or may include none of the first end power generation unit 16 and the second end power generation unit 22.

What is claimed is:

1. A fuel cell stack comprising:
   a stack body including a plurality of power generation cells stacked in a stacking direction, the power generation cells each comprising a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly; and
   a dummy cell provided at least at one end of the stack body in the stacking direction,
   wherein the dummy cell includes a dummy structural body corresponding to the membrane electrode assembly, and a dummy resin frame member provided around an outer periphery of the dummy structural body;
   the dummy structural body is formed by stacking a first electrically conductive porous body, a second electrically conductive porous body having a surface size smaller than that of the first electrically conductive porous body, and a third electrically conductive porous body having a surface size smaller than that of the second electrically conductive porous body together in this order;
   the first electrically conductive porous body includes a first outer peripheral portion extending outside an outer peripheral end surface of the second electrically conductive porous body;
   the second electrically conductive porous body includes a second outer peripheral portion extending outside an outer peripheral end surface of the third electrically conductive porous body; and
   the dummy structural body and the dummy resin frame member are joined together through an adhesive layer which adheres the first outer peripheral portion, the second outer peripheral portion, and an inner periphery of the dummy resin frame member to each other.

2. The fuel cell stack according to claim 1, wherein, in a surface direction of the dummy structural body, the adhesive layer extends toward inside and outside from an outer peripheral end surface of the second electrically conductive porous body.

3. The fuel cell stack according to claim 2, wherein in the surface direction of the dummy structural body, the adhesive layer is provided inside an outer peripheral end surface of the first electrically conductive porous body; and
  an outer end of the adhesive layer in the surface direction is positioned close to a gap formed between the first electrically conductive porous body and the dummy resin frame member.

4. The fuel cell stack according to claim 1, wherein, in the stacking direction of the dummy structural body, the adhesive layer is formed by hardening an adhesive impregnated into the entire second electrically conductive porous body and part of the first electrically conductive porous body positioned close to the second electrically conductive porous body.

5. The fuel cell stack according to claim 1, wherein the dummy resin frame member includes an outer peripheral frame, a shelf portion protruding inward over the entire periphery from an inner peripheral portion of the outer peripheral frame through a first stepped surface, and the thin portion protruding inward over an entire periphery from an inner peripheral portion of the shelf portion through a second stepped surface;
  an outer periphery of the first outer peripheral portion is stacked on the shelf portion;
  the second outer peripheral portion is positioned close to the thin portion; and
  the outer peripheral end surface of the third electrically conductive porous body faces the inner peripheral end surface of the dummy resin frame member.

6. The fuel cell stack according to claim 5, wherein a bank protruding toward the second electrically conductive porous body is provided over the entire periphery of the inner peripheral portion of the thin portion, and a protruding end surface of the bank and the second electrically conductive porous body contact each other.

7. The fuel cell stack according to claim 6, wherein in a surface direction of the thin portion, the adhesive layer is provided in a groove provided between the second stepped surface and the bank, at a distance from each of the second stepped surface and the shelf portion.

8. The fuel cell stack according to claim 5, wherein a thickness of the second electrically conductive porous body is larger than a height of the second stepped surface.

9. The fuel cell stack according to claim 1, wherein the adhesive layer is formed by hardening thermosetting resin.

10. A method of producing a dummy cell provided at least at one end of a stack body of a fuel cell stack in a stacking direction,
  the fuel cell stack comprising:
  the stack body including a plurality of power generation cells stacked in the stacking direction, the power generation cells each comprising a membrane electrode assembly including an electrolyte membrane and electrodes provided on both sides of the electrolyte membrane, the electrodes each having a gas diffusion layer of electrically conductive porous body, and a resin frame member provided around an outer periphery of the membrane electrode assembly,
  the method comprising:
  a dummy structural body forming step of obtaining a dummy structural body corresponding to the membrane electrode assembly by stacking a first electrically conductive porous body, a second electrically conductive porous body having a surface size smaller than that of the first electrically conductive porous body, and a third electrically conductive porous body having a surface size smaller than that of the second electrically conductive porous body together in this order; and
  a joining step of joining the dummy structural body and the dummy resin frame member provided around an outer periphery of the dummy structural body together,
  wherein the first electrically conductive porous body includes a first outer peripheral portion extending outside an outer peripheral end surface of the second electrically conductive porous body;
  the second electrically conductive porous body includes a second outer peripheral portion extending outside an outer peripheral end surface of the third electrically conductive porous body; and
  in the joining step, an adhesive interposed between the first and second outer peripheral portions and an inner periphery of the dummy resin frame member is hardened to form an adhesive layer which adheres the first and second outer peripheral portions and the dummy resin frame member to each other.

11. The method producing the dummy cell according to claim 10, wherein in the joining step, in a surface direction of the dummy structural body, the adhesive layer extending from an outer peripheral end surface of the second electrically conductive porous body toward inside and outside is formed.

12. The method of producing the dummy cell according to claim 11, wherein in the joining step, in the surface direction of the dummy structural body, the adhesive is provided inside the outer peripheral end surface of the first electrically conductive porous body, and the adhesive layer is formed while maintaining a state where a gap is formed outside portion where the adhesive is interposed between the first electrically conductive porous body and the dummy resin frame member.

13. The method of producing the dummy cell according to claim 10, wherein in the joining step, by stacking the first outer peripheral portion and the second outer peripheral portion on the inner periphery of the dummy resin frame member where the adhesive is disposed, the adhesive is impregnated into the entire second electrically conductive porous body and part of the first electrically conductive porous body positioned close to the second electrically conductive porous body in the stacking direction of the dummy structural body, and the adhesive is hardened to form the adhesive layer.

14. The method of producing the dummy cell according to claim 10, wherein in the joining step, the dummy structural body and the dummy resin frame member provided with the adhesive between the dummy structural body and the dummy resin frame member are held between molds, and the adhesive comprising thermosetting resin is thermally hardened to form the adhesive layer.

* * * * *